(12) United States Patent
Topliss et al.

(10) Patent No.: US 11,567,204 B2
(45) Date of Patent: Jan. 31, 2023

(54) MIRROR TILT ACTUATOR

(71) Applicant: Apple Inc., Cupertino, CA (US)

(72) Inventors: Richard J. Topliss, Campbell, CA (US); Thomas M. Gregory, Cupetino, CA (US)

(73) Assignee: Apple Inc., Cupertino, CA (US)

( * ) Notice: Subject to any disclaimer, the term of this patent is extended or adjusted under 35 U.S.C. 154(b) by 1144 days.

(21) Appl. No.: 16/160,707

(22) Filed: Oct. 15, 2018

(65) Prior Publication Data

US 2019/0049587 A1 Feb. 14, 2019

Related U.S. Application Data

(63) Continuation of application No. 14/800,641, filed on Jul. 15, 2015, now Pat. No. 10,101,457.

(51) Int. Cl.
| | |
|---|---|
| *G01C 3/08* | (2006.01) |
| *G01S 17/89* | (2020.01) |
| *G02B 26/10* | (2006.01) |
| *G02B 7/182* | (2021.01) |
| *G01S 7/481* | (2006.01) |
| *H01F 27/28* | (2006.01) |
| *H01F 7/02* | (2006.01) |
| *G02B 5/08* | (2006.01) |
| *H01F 1/153* | (2006.01) |
| *G01S 17/08* | (2006.01) |

(52) U.S. Cl.
CPC ............ *G01S 17/89* (2013.01); *G01S 7/4817* (2013.01); *G01S 17/08* (2013.01); *G02B 5/08* (2013.01); *G02B 7/1821* (2013.01); *G02B 26/101* (2013.01); *G02B 26/105* (2013.01); *H01F 1/153* (2013.01); *H01F 7/0242* (2013.01); *H01F 27/28* (2013.01); *G05G 2700/00* (2013.01)

(58) Field of Classification Search
CPC ........ G01S 17/89; G01S 7/4817; G01S 17/08; G02B 5/08; G02B 7/1821; G02B 26/101; G02B 26/105; H01F 1/153; H01F 7/0242; H01F 27/28; G05G 2700/00
See application file for complete search history.

(56) References Cited

U.S. PATENT DOCUMENTS

| | | |
|---|---|---|
| 6,791,699 B2 | 9/2004 | Aoki |
| 6,838,688 B2 | 1/2005 | Aoki |
| 10,101,457 B1 | 10/2018 | Topliss et al. |
| 2005/0127185 A1* | 6/2005 | Wilz ................ G06K 7/10693 235/462.31 |

(Continued)

FOREIGN PATENT DOCUMENTS

EP 2000733 A2 * 12/2008 ............. F16M 11/10

*Primary Examiner* — Samantha K Nickerson
(74) *Attorney, Agent, or Firm* — Robert C. Kowert; Kowert, Hood, Munyon, Rankin & Goetzel, P.C.

(57) ABSTRACT

In some embodiments, a depth map acquisition system, includes a housing, a light source for emitting light to illuminate objects in a scene subject to depth mapping, fixedly mounted to the housing, a mirror tilt actuator, fixedly mounted to the housing, for tilting a mirror fixedly mounted to the mirror tilt actuator, a mirror fixedly mounted to the mirror tilt actuator, for reflecting light from the light source to the objects, and a partially transparent photosensitive detector in the direct path of the light from the mirror to the objects.

20 Claims, 22 Drawing Sheets

(56) References Cited

U.S. PATENT DOCUMENTS

| | | | |
|---|---|---|---|
| 2007/0120392 A1* | 5/2007 | Wolfinger | F16B 45/00 296/100.17 |
| 2008/0043305 A1* | 2/2008 | Song | G02B 7/1821 359/198.1 |
| 2009/0268309 A1 | 10/2009 | Ke | |
| 2011/0292406 A1 | 12/2011 | Hollenbeck et al. | |
| 2012/0069051 A1 | 3/2012 | Hagbi et al. | |
| 2013/0314681 A1 | 11/2013 | Erath et al. | |
| 2015/0042870 A1* | 2/2015 | Chan | H04N 5/2257 359/733 |
| 2015/0091859 A1* | 4/2015 | Rosenberg | G06F 3/03545 345/174 |
| 2016/0323562 A1 | 11/2016 | Nawasra et al. | |

\* cited by examiner

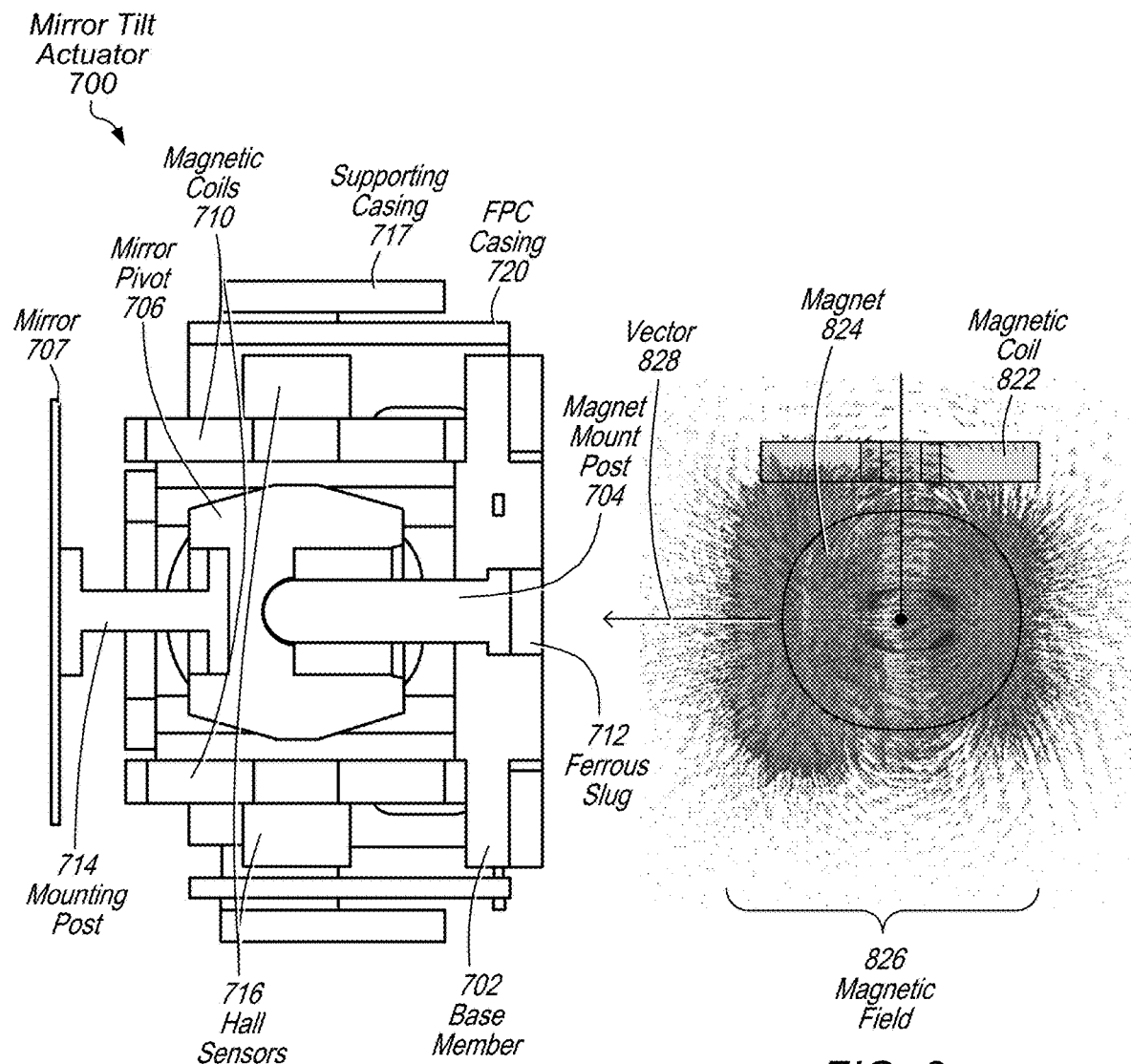

MIRROR TILT ACTUATOR

This application is a continuation of U.S. patent application Ser. No. 14/800,641, filed Jul. 15, 2015, now U.S. Pat. No. 10,101,457, which is hereby incorporated by reference herein in its entirety.

BACKGROUND

Technical Field

This disclosure relates generally to depth map acquisition systems, and, more specifically, to tiltable mirrors for depth map acquisition systems.

Description of the Related Art

In 3D computer graphics, a depth map is an image or image channel that contains information relating to the distance of the surfaces of scene objects from a viewpoint. Many potential applications for depth maps exist in the functions or potential functions of miniature cameras. Miniature cameras, such as those typically used in mobile devices such as cellphones and other multifunction devices, could provide additional functions to the user if depth maps could be easily acquired.

In such devices, however, space is a premium and every effort is made to minimize the camera size.

SUMMARY OF EMBODIMENTS

In some embodiments, a depth map acquisition system includes a housing, a light source for emitting light to illuminate objects in a scene subject to depth mapping, fixedly mounted to the housing, a mirror tilt actuator, fixedly mounted to the housing, for tilting a mirror fixedly mounted to the mirror tilt actuator, a mirror fixedly mounted to the mirror tilt actuator, for reflecting light from the light source to the objects, and a partially transparent photosensitive detector in the direct path of the light from the mirror to the objects.

BRIEF DESCRIPTION OF THE DRAWINGS

FIG. 7 illustrates a mirror tilt actuator for use with a depth map acquisition system for use in portable multifunction device in accordance with some embodiments.

FIG. 8 depicts a magnetic field associated with a mirror tilt actuator for use with a depth map acquisition system for use in portable multifunction device in accordance with some embodiments.

Figure 1:
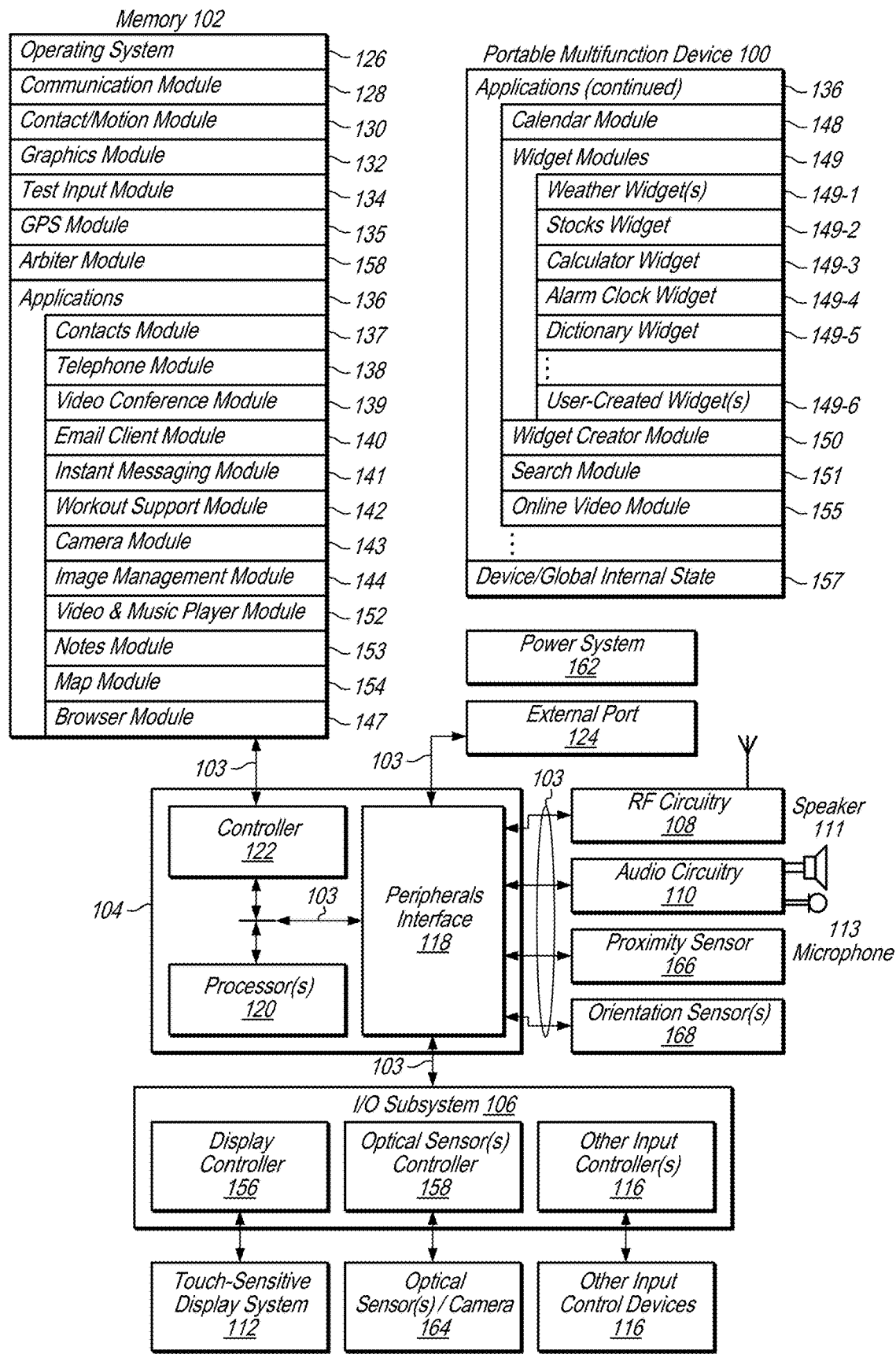
FIG. 1 illustrates a block diagram of a portable multifunction device in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Introduction

Some embodiments provide an actuator that tilts a mirror independently about two orthogonal axes. In some embodiments, the mirror is used to raster scan a laser light beam in a depth map acquisition system. As such, in some embodiments the movement requirements for movements about the two notional orthogonal tilt axes are different. Hence there is a 'fast' axis and a 'slow' axis. In some embodiments, the slow axis scans around 30 Hz (although this is not a limitation, and future implementations may require different frequencies). In some embodiments, the fast axis scans at around 400 Hz (although faster is beneficial).

In some embodiments, the mirror tilt actuator is usable for directing a light beam in a controlled manner into a two-dimensional space.

In some embodiments, the actuator technology is electromagnetic, including one or more magnets and multiple energized coils disposed around the magnet(s). The combination of magnetic fields and current carrying wires generates Lorentz forces between the coils and the magnet, and hence generates torques and angular movement.

In some embodiments, a moving magnet is rigidly joined to the tilting mirror. Arranged around the magnet are plural coils that are fixed in position relative to the support structure of the system. Some embodiments are built on the assumption that, during each frame, only a portion of the field of view that contains objects of interest needs to be scanned.

In some embodiments, by 'direct drive', the actuator is able to move, hold and control the mirror position during a scan, rather than merely set the mirror oscillating as resonance (albeit with an associated measurement of its resulting position).

In some embodiments, the actuator is a 'direct drive' actuator that employs a single magnet surrounded by plural coils with dimensions of the magnet that are smaller than the coil arrangement and a coil arrangement that uses multiple electrical connections.

In some embodiments, the moving magnet allows a position sensing solution with the position sensors to detect the changing magnetic field from the magnet, rather than some property of the coils. In some embodiments, Hall sensors are used to detect the changing magnetic field and hence the tilt of the magnet. In addition, some embodiments include a pivot without a resilient spring to keep the moving body on the pivot, and to provide a resistance to the tilting force, which acts to center the moving body.

In some embodiments, a slug of magnetic material fixed to the support structure is attracted by the magnet, and hence both provides a contact force onto the pivot and generates a restoring torque as the magnet is tilted.

Some embodiments include an actuator that tilts a body, such as an optical mirror, about two orthogonal axes. In some embodiments, the actuator includes a magnet with four coils disposed around the sides of the magnet. In some embodiments, the magnet is poled such the north and south poles represented by faces of the magnet are oriented such that neither face is adjacent to one of the four coils. In some embodiments, coils on opposite sides of the magnet are electrically in series and work in concert to generate Lorentz forces that deliver a net torque between the coil assembly and the magnet. In some embodiments, these Lorentz forces are a result of the currents through the coils interacting with the fringing field of the magnet. In some embodiments, the coils are fixed relative to a support structure, and the magnet is tilting, with the mirror rigidly joined to the magnet.

In some embodiments, the magnet is mounted on a pivot and held against the pivot by magnetic attraction between the magnet and a magnetic material the other side of the pivot. In some embodiments, the mutual attraction also provides a restoring torque to resist the actuated tilt. In some embodiments, one pair of opposing coils is larger in size than a second pair of orthogonal opposing coils.

In some embodiments, the magnet and mirror have circular symmetry to avoid the need to constrain the magnet against rotations on the pivot about an axis orthogonal to the mirror surface.

In some embodiments, a depth map acquisition system, includes a housing, a light source for emitting light to illuminate objects in a scene subject to depth mapping, fixedly mounted to the housing a mirror tilt actuator, fixedly mounted to the housing, for tilting a mirror fixedly mounted to the mirror tilt actuator, a mirror fixedly mounted to the mirror tilt actuator, for reflecting light from the light source to the objects, and a partially transparent photosensitive detector in the direct path of the light from the mirror to the objects.

In some embodiments, the mirror tilt actuator includes a base member, fixedly mounted to the housing, a magnet mount post, fixedly mounted to the base member, for mounting a mirror pivot, a mirror pivot including a magnetic component, moveably mounted to the magnet mount post, and one or more magnetic coils, fixedly mounted to the base member, for providing one or more magnetic forces to adjust an orientation of the mirror pivot. In some embodiments, the mirror fixedly mounts to the mirror pivot.

In some embodiments, the mirror tilt actuator includes a base member, fixedly mounted to the housing, a magnet mount post, fixedly mounted to the base member, for mounting a mirror pivot; a mirror pivot including a magnetic component, moveably mounted to the magnet mount post, and one or more magnetic coils, fixedly mounted to the base member, for providing one or more magnetic forces to adjust an orientation of the mirror pivot. In some embodiments, the mirror fixedly mounts to the mirror pivot by means of a mounting post fixedly mounted between the mirror and the mirror pivot.

In some embodiments, the mirror tilt actuator includes a base member, fixedly mounted to the housing, a magnet mount post, fixedly mounted to the base member, for mounting a mirror pivot, a mirror pivot including a magnetic component, moveably mounted to the magnet mount post, a ferrous slug, fixedly mounted to the base member beneath the post magnet mount post, for attracting and retaining the mirror pivot by means of a magnetic attraction force between the mirror pivot and the ferrous slug, and one or more magnetic coils, fixedly mounted to the base member, for providing one or more magnetic forces to adjust an orientation of the mirror pivot. the mirror fixedly mounts to the mirror pivot In some embodiments, the mirror tilt actuator includes a base member, fixedly mounted to the housing, a magnet mount post, fixedly mounted to the base member, for mounting a mirror pivot, a mirror pivot including a magnetic barrel component, and one or more magnetic coils, fixedly mounted to the base member, for providing one or more magnetic forces to adjust an orientation of the mirror pivot. In some embodiments, the magnetic barrel component is moveably mounted to the magnet mount post, wherein the mirror fixedly mounts to the mirror pivot. In some embodiments, the magnetic barrel component includes a hollow interior space for mounting to the post. In some embodiments, the magnetic barrel component includes a permanent magnet.

In some embodiments, the mirror tilt actuator includes a base member, fixedly mounted to the housing, a magnet mount post, fixedly mounted to the base member, for mounting a mirror pivot, a mirror pivot including a magnetic component, moveably mounted to the magnet mount post, and one or more magnetic coils, fixedly mounted to the base member, for providing one or more magnetic forces to adjust an orientation of the mirror pivot. In some embodiments, the mirror fixedly mounts to the mirror pivot by means of a mounting post fixedly mounted between the mirror and the mirror pivot.

In some embodiments, the partially transparent photosensitive detector in the direct path of the light from the mirror to the objects further includes a partially transparent photosensitive detector mounted in the cover glass of a device in which the depth map acquisition system is mounted.

In some embodiments, the partially transparent photosensitive detector in the direct path of the light from the mirror to the objects further includes a photosensitive detector in the direct path of a beam of light to a scene to determine the outgoing angle of such light for use in either construction of a digital representation of the scene.

In some embodiments, the mirror tilt actuator includes a moving magnet, and four non-moving coils disposed around four sides of the magnet. In some embodiments, when driven with electric signals, the four non-moving coils generate Lorentz forces that tend to tilt the magnet and the mirror about a pivot.

In some embodiments, the mirror tilt actuator includes: a base member, fixedly mounted to the housing, a magnet mount post, fixedly mounted to the base member, for mounting a mirror pivot, one or more magnetic coils, fixedly mounted to the base member, for providing one or more magnetic forces to adjust an orientation of a mirror pivot, and the mirror pivot. In some embodiments, the mirror pivot includes a magnetic barrel component, and a fringing field of the moving magnet includes components of magnetic field in the appropriate directions to deliver the Lorentz forces, when the coils are electrically driven.

Some embodiments include a method for generating a depth map. In some embodiments, the method includes a light source emitting light to illuminate objects in a scene subject to depth mapping. In some embodiments, the method includes reflecting the light at an outgoing angle using a mirror fixedly mounted to a mirror tilt actuator, for reflecting light from the light source to one or more objects in the scene. In some embodiments, the method includes measuring an outgoing angle of the light using a partially transparent photosensitive detector in a direct path of the light. In some embodiments, the method includes a detector mounted within the housing, receiving reflected light from the objects.

In some embodiments, the method includes, based on the reflected light, constructing a depth map of the scene. In some embodiments, the method includes the mirror tilt actuator adjusting a position of the mirror to adjust the outgoing angle.

In some embodiments, the method includes the mirror tilt actuator adjusting a position of the mirror to adjust the outgoing angle by one or more magnetic coils providing one or more magnetic forces to adjust an orientation of a mirror pivot In some embodiments, the one or more magnetic coils are fixedly mounted to a base member of the mirror tilt actuator. In some embodiments, the mirror pivot includes a magnetic barrel component. In some embodiments, the magnetic barrel component is moveably mounted to the magnet mount post, wherein the mirror fixedly mounts to the mirror pivot. In some embodiments, the magnetic barrel component includes a hollow interior space for mounting to the post. In some embodiments, the magnetic barrel component includes a permanent magnet.

In some embodiments, the method includes the mirror tilt actuator adjusting a position of the mirror to adjust the outgoing angle based on calculations of a closed loop feedback system in response to the measuring the outgoing angle of the light using the partially transparent photosensitive detector.

In some embodiments, the method includes the mirror tilt actuator adjusting a position of the mirror to adjust the outgoing angle the light by driving electricity though one or more coils disposed about the sides of the mirror pivot to interact with a fringing field of the mirror pivot, wherein the fringing gield includes components of magnetic field in the appropriate directions to deliver the Lorentz forces, when the coils are electrically driven.

In some embodiments, the method includes the mirror tilt actuator adjusting a position of the mirror to adjust the outgoing angle by one or more magnetic coils providing one or more magnetic forces to adjust an orientation of a mirror pivot. In some embodiments, the one or more magnetic coils are fixedly mounted to a base member of the mirror tilt actuator. In some embodiments, the mirror pivot includes a magnetic barrel component. In some embodiments, the magnetic barrel component is moveably mounted to the magnet mount post, wherein the mirror fixedly mounts to the mirror pivot.

Some embodiments include a mirror tilt actuator. In some embodiments, the mirror tilt actuator includes a base member, fixedly mounted to a housing, a magnet mount post, fixedly mounted to the base member, for mounting a mirror pivot, a mirror pivot including a magnetic component, moveably mounted to the magnet mount post, wherein the mirror fixedly mounts to the mirror pivot, and one or more magnetic coils, fixedly mounted to the base member, for providing one or more magnetic forces to adjust an orientation of the mirror pivot.

In some embodiments, the mirror tilt actuator further includes a ferrous slug, fixedly mounted to the base member beneath the post magnet mount post, for attracting and retaining the mirror pivot by means of a magnetic attraction force between the mirror pivot and the ferrous slug.

In some embodiments, the mirror pivot further includes a magnetic barrel component. In some embodiments, the magnetic barrel component is moveably mounted to the magnet mount post, wherein the mirror fixedly mounts to the mirror pivot. In some embodiments, the magnetic barrel component includes a hollow interior space for mounting to the post. In some embodiments, the magnetic barrel component includes a permanent magnet. In some embodiments, the actuator further includes one or more magnetic coils, fixedly mounted to the base member, for providing one or more magnetic forces to adjust an orientation of the mirror pivot.

In some embodiments, the mirror fixedly mounts to the mirror pivot by means of a mounting post fixedly mounted between the mirror and the mirror pivot. In some embodiments, the actuator further includes four non-moving coils disposed around four sides of the magnet. In some embodiments, when driven with electric signals, the four non-moving coils generate Lorentz forces that tend to tilt the magnet and the mirror about a pivot.

In some embodiments, a narrow beam of light (e.g., from a laser) is modulated in angle by a reflective surface, such as the actuator-controlled mirrors discussed herein. Such modulation allows digital recording or recreation of a scene in one or more degrees of freedom. Applications of such embodiments include digital projectors, LIDAR and bar code scanners, cameras and depth-map acquisition systems.

In some applications, knowing the angle of the steered beam of light with time is useful for accurate recording or recreating a scene. Many measurement techniques can be used to achieve this, broadly they can be classified into direct optical measurements and indirect non-optical measurements. In some embodiments, indirect non-optical measurements involve methods for measuring some property of the actuator driving the tilt or the position of moving parts. In some embodiments, such methods include capacitive position sensing or shaft rotary encoders. In some embodiments, direct optical measurements include methods for measuring the position on a 2D plane of the reflected beam of light itself using a photosensitive detector sensor. In some embodiments, a photosensitive diode allows the majority of incident light (at IR wavelengths) to pass through, simplifying the system by placing the photodiode directly in the outgoing beam of light (and thus removing the need for either a beam splitter (or indirect angle measurement method). In some embodiments, this allows the beam scanning system to be made far more compact and potentially achieve greater angular range. In some embodiments, the outgoing beam of light typically has great enough intensity that a good signal-to-noise ratio on the position measurement can still be achieved. In some embodiments, photosensitive detector can be mounted to the cover glass of the system, adding very little volume to the device Some embodiments place a partially transparent photosensitive detector in the direct path of a beam of light to a scene to determine the outgoing angle of such light for use in either reconstruction or acquisition of a digital representation of the scene.

Some embodiments place a partially transparent photosensitive detector in the direct path of a beam of light to a scene to determine the outgoing angle of such light for use in either reconstruction or acquisition of a digital representation of the scene with a closed loop feedback system to accurately position the tilting surface.

Some embodiments place a partially transparent photosensitive detector in the direct path of a beam of light to a scene to determine the outgoing angle of such light for use in either reconstruction or acquisition of a digital representation of the scene with the photosensitive detector being a subcomponent of the cover glass of the device.

Some embodiments place a partially transparent photosensitive detector in the direct path of a beam of light to a scene to determine the outgoing angle of such light for use in either reconstruction or acquisition of a digital representation of the scene with multiple photosensitive detectors and a very large angle scanning system to achieve full 360-degree field of view.

Multifunction Device

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller).

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Attention is now directed toward embodiments of portable devices. FIG. 1 is a block diagram illustrating portable multifunction device 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1 may be implemented in hardware, software, or a combination of hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used. Depth mapping systems as described herein may be free standing or components of other systems within proximity sensors 166 or optical sensors/cameras 164.

The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1 shows an optical sensor coupled to optical sensor controller 159 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for video-conferencing while the user views the other video conference participants on the touch screen display.

Device 100 may also include one or more proximity sensors 166. FIG. 1 shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 includes one or more orientation sensors 168. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 100. In some embodiments, the one or more orientation sensors include any combination of orientation/rotation sensors. FIG. 1 shows the one or more orientation sensors 168 coupled to peripherals interface 118. Alternately, the one or more orientation sensors 168 may be coupled to an input controller 160 in I/O subsystem 106. In some embodiments, information is displayed on the touch screen display in a portrait view or a landscape view based on an analysis of data received from the one or more orientation sensors.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, arbiter module 158 and applications (or sets of instructions) 136. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; state information that indicates which processes control output of shared audio or visual resource of a vehicle; ownership transition conditions of the shared audio or visual resource; and location information concerning the device's location and/or attitude.

Operating system 126 (e.g., Darwin, LINUX, UNIX, OS X, WINDOWS, or an embedded operating system such as VxWorks or RTXC) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.).

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
contacts module 137 (sometimes called an address book or contact list);
telephone module 138;
video conferencing module 139;

e-mail client module 140;
instant messaging (IM) module 141;
workout support module 142;
camera module 143 for still and/or video images and/or depth mapping;
image management module 144;
browser module 147;
calendar module 148;
widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which may be made up of a video module and a music module;
notes module 153;
map module 154; and/or
online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102), including: adding name(s) to the address book; deleting name(s) from the address book; associating telephone number(s), e-mail address(es), physical address (es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 108, audio circuitry 110, speaker 111, microphone 113, touch screen 112, display controller 156, and communication module 128, arbiter module 158 negotiates control of a shared audio or visual resource of an automobile. A request for control of a shared audio or visual resource of the vehicle is received at arbiter module 158. Arbiter module 158 maintains existing state information for ownership of the shared audio or visual resource and ownership transition conditions of the shared audio or visual resource. The request for control of the shared audio or visual resource of the vehicle is received from one of a plurality of processes including a process executing on an embedded system attached to the vehicle and a process executing on a mobile computing device (portable multifunction device 100) temporarily communicating with the vehicle. New state information regarding ownership of the shared audio or visual resource is determined by arbiter module 158 based at least in part on the request for control and the ownership transition conditions. The new state information indicates which of the processes controls output of the shared audio or visual resource of the vehicle. New ownership transition conditions of the shared audio or visual resource are determined by arbiter module 158 and communicated to a controller interface of the shared audio or visual resource.

In conjunction with RF circuitry 108, audio circuitry 110, speaker 111, microphone 113, touch screen 112, display controller 156, optical sensor 164, arbiter module 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 159, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 1493, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player.

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

While a portable or mobile computing device is shown as one embodiment of a multifunction device, one of skill in the art will readily realize in light of having read the current disclosure that a desktop computer or other computing device may also perform many of the functions described herein without departing from the scope and intent of the present disclosure. Likewise, while touch screen devices are shown as one embodiment of a multifunction device, one of skill in the art will readily realize in light of having read the current disclosure that a desktop computer or other computing device without a touch screen may also perform many of the functions described herein without departing from the scope and intent of the present disclosure.

Figure 2:
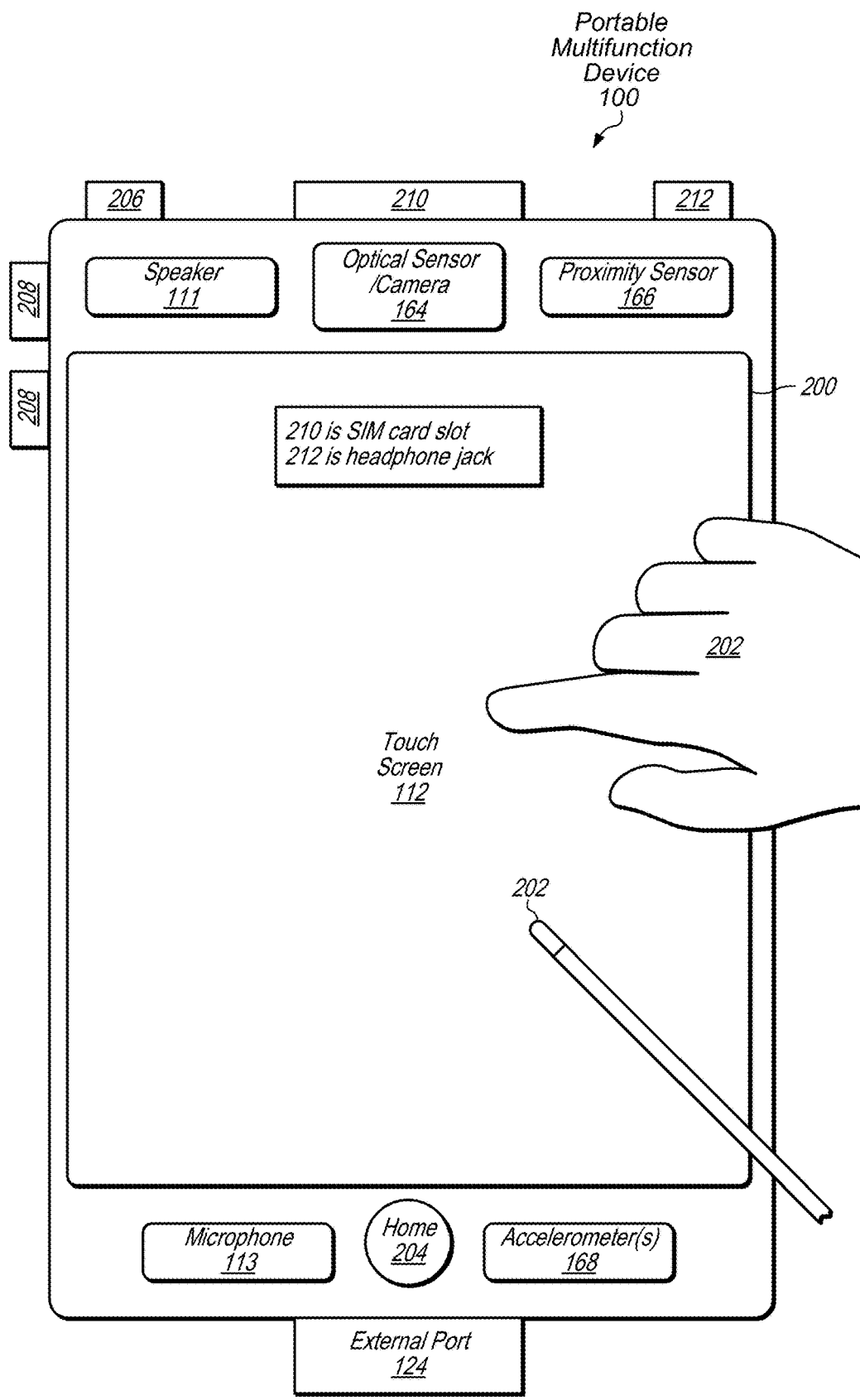
FIG. 2 illustrates a portable multifunction device in accordance with some embodiments.

FIG. 2 illustrates a portable multifunction device 100 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure).

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process.

In an alternative embodiment, device 100 also may accept verbal input for activation or deactivation of some functions through microphone 113.

Operational Principle of Depth Map Acquisition System

Figure 3:
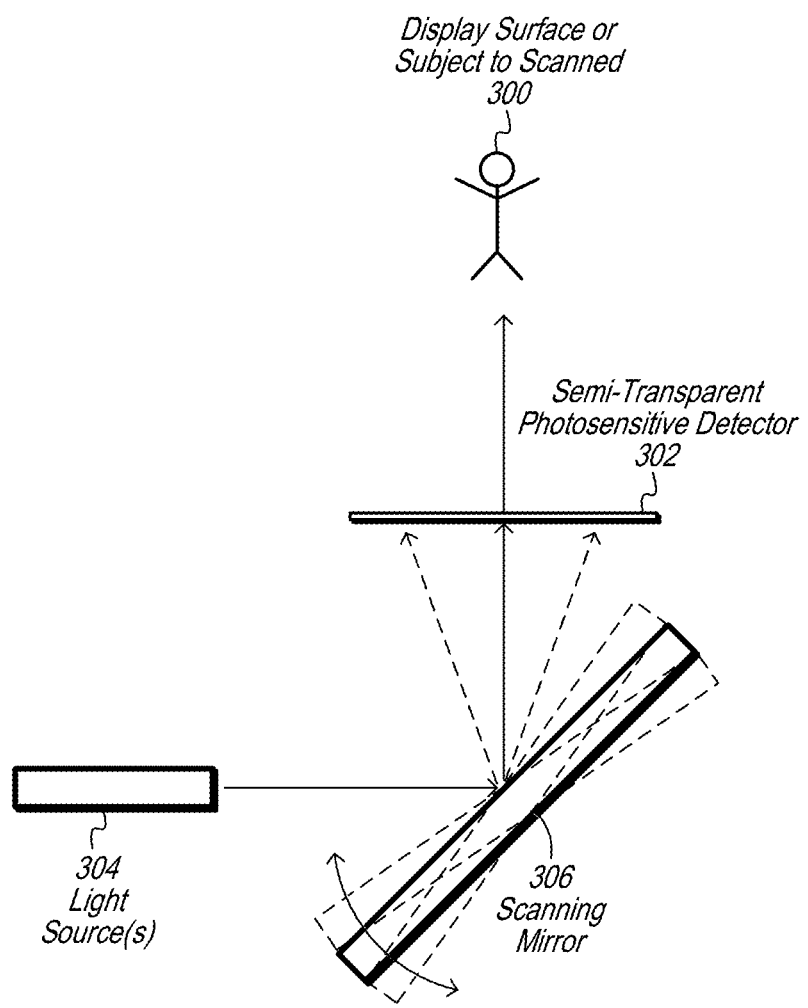
FIG. 3 depicts components of a depth map acquisition system for use in portable multifunction device in accordance with some embodiments.

FIG. 3 depicts operation of a depth map acquisition system for use in portable multifunction device in accordance with some embodiments. Some embodiments function by reflecting light from a light source into a subject scene, such as display surface or subject to be scanned 300 and receiving the light at a detector 302 for measurement of the light and construction of a depth map. A housing, which is omitted for simplicity in FIG. 3, contains a light source 304, a scanning mirror 306 coupled to an actuator (not shown), and a semi-transparent photosensitive detector.

Some embodiments include a light source 304 for emitting light to illuminate objects in a scene subject to depth mapping 300, and the light source is fixedly mounted to the housing (not shown). Some embodiments include a mirror tilt actuator (not shown), fixedly mounted to the housing (not shown), for tilting mirror 306, and mirror 306 is fixedly mounted to the mirror tilt actuator (not shown). In some embodiments, mirror 306 is fixedly mounted to the mirror tilt actuator (not shown), for reflecting light from the light source 304 to the objects 300. Some embodiments include a partially transparent photosensitive detector 302 in the direct path of the light from the mirror to the objects. In some embodiments, partially transparent photosensitive detector 302 is used to detect the angle of outgoing light from light source 304. In other embodiments, partially transparent photosensitive detector 302 also detects light returned from the objects 300. In some embodiments, partially transparent photosensitive detector 302 is used to detect outgoing light from light source 304, and secondary detectors (not shown) are used to detect returning light reflected from the objects.

Figure 4:
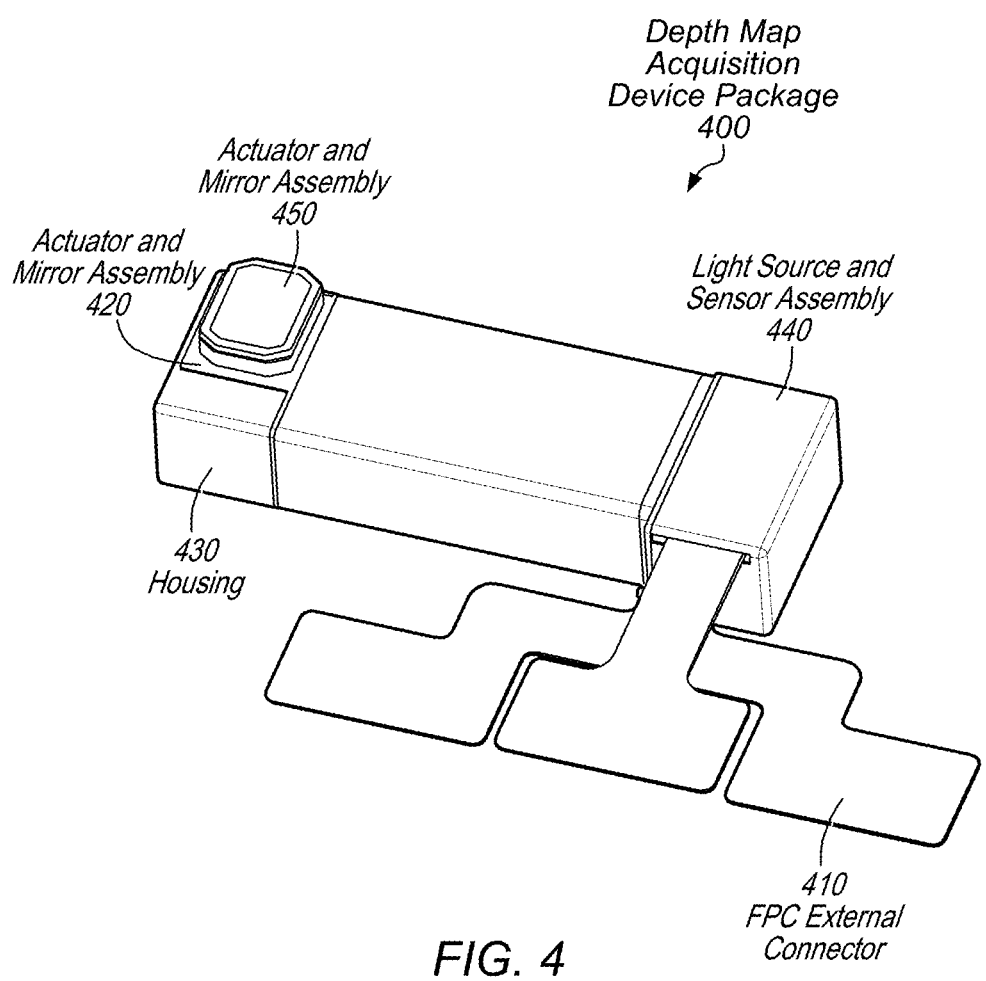
FIG. 4 depicts operation of a depth map acquisition system for use in portable multifunction device in accordance with some embodiments.

FIG. 4 depicts components of a depth map acquisition system, which may be part of a camera system for use with in portable multifunction device in accordance with some embodiments. A lens and mirror assembly 420, and a light source and sensor assembly 440 are shown as components of an depth map acquisition device package 400, which connects to other components of a multifunction device by means of a FPC external connector 410.

A depth map acquisition device package 400, which is one embodiment of a depth map acquisition system, includes a housing 430 of an actuator and mirror assembly 420. A light source for emitting light to illuminate objects in a scene subject to depth mapping, such as light source and sensor assembly 440 is fixedly mounted to the housing. A mirror tilt actuator, fixedly mounted to the housing 430 is contained within actuator and mirror assembly 420, for tilting a mirror fixedly mounted to the mirror tilt actuator within actuator and mirror assembly 420. A mirror fixedly mounted to the mirror tilt actuator within actuator and mirror assembly 420, is used for reflecting light from the light source to the objects. In some embodiments, cover glass 450 includes a partially transparent photosensitive detector in the direct path of the light from the mirror to the objects.

Figures 5, 6:
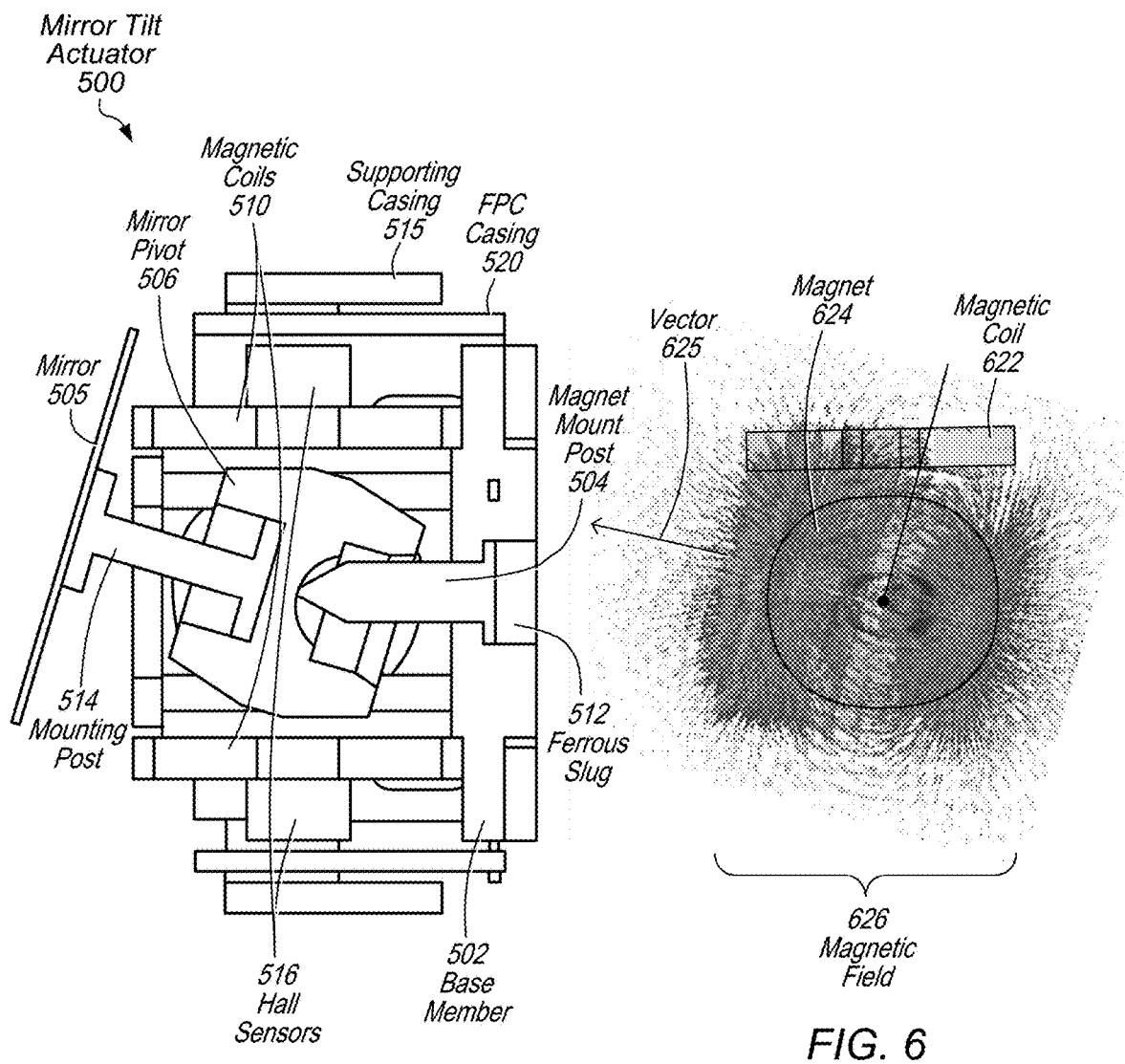
FIG. 5 illustrates a mirror tilt actuator for use with a depth map acquisition system for use in portable multifunction device in accordance with some embodiments.
FIG. 6 depicts a magnetic field associated with a mirror tilt actuator for use with a depth map acquisition system for use in portable multifunction device in accordance with some embodiments.

FIG. 5 illustrates a mirror tilt actuator for use with a depth map acquisition system for use in portable multifunction device in accordance with some embodiments, in a tilted state. A mirror tilt actuator 500 includes a base member 502, which is fixedly mounted to a housing such as supporting casing 515.

A magnet mount post 504 is fixedly mounted to the base member 502, for mounting a mirror pivot 506, which in some embodiments includes a magnetic component. In some embodiments mirror pivot 506 is entirely fabricated from permanently magnetic material. In other embodiments, mirror pivot 506 includes one or more components fabricated from permanently magnetic material and one or more components fabricated from non-magnetic material. The mirror pivot 506 is moveably mounted to the magnet mount post 504. In some embodiments, a mirror 505 is fixedly mounted to the mirror pivot 506. In some embodiments, one or more magnetic coils 510a is fixedly mounted to the base member 502, for providing one or more magnetic forces to adjust an orientation of the mirror pivot 506.

In some embodiments, a ferrous slug 512 is fixedly mounted to the base member 502 beneath the magnet mount post 504, for attracting and retaining the mirror pivot by means of a magnetic attraction force between the mirror pivot and the ferrous slug.

In some embodiments, the mirror pivot 506 is configured as a magnetic barrel component, which is roughly cylindrical with a partially hollow interior having one or more cavities, at least one of which is used for insertion of the magnetic mount post 504. In some embodiments, the magnetic barrel component 506 is moveably mounted to the magnet mount post 504. In some embodiments, the mirror 505 fixedly mounts to the mirror pivot 506. In some embodiments, the magnetic barrel component 506 includes a hollow interior space for mounting to the magnetic mount post 504, and the magnetic barrel component 506 includes a permanent magnet.

In some embodiments, the mirror 505 fixedly mounts to the mirror pivot 506 by means of a mounting post 514, fixedly mounted between the mirror 505 and the mirror pivot 506. In some embodiments, the mirror 505 fixedly mounts directly to the mirror pivot 506, for example by means of an adhesive of a mechanical connection, without the need for mounting post 514, fixedly mounted between the mirror 505 and the mirror pivot 506. Some embodiments further include Hall sensors 516 for detecting magnetic fields within the actuator 500 as well as a supporting casing 515 and a printed circuit board casing 520 for connecting components such as magnetic coils 510 and Hall sensors 516 for power and signaling.

In some embodiments, four non-moving coils 510 are disposed around four sides of the magnet 506, such that when driven with electric signals delivered through FPC casing 520, the four non-moving coils generate Lorentz forces that tend to tilt the magnet 506 and the mirror 505 about a post 504.

FIG. 6 depicts magnetic fields surrounding a mirror tilt actuator for use with a depth map acquisition system for use in portable multifunction device in accordance with some embodiments, in a tilted state. A magnetic coil 622 and magnet 624 are shown with a magnetic field 626 and a vector 626 normal to the surface of the mirror.

FIG. 7 illustrates a mirror tilt actuator for use with a depth map acquisition system for use in portable multifunction device in accordance with some embodiments, in a centered state. A mirror tilt actuator 700 includes a base member 702, which is fixedly mounted to a housing such as supporting casing 717.

A magnet mount post 704 is fixedly mounted to the base member 702, for mounting a mirror pivot 706, which in some embodiments includes a magnetic component. In some embodiments mirror pivot 706 is entirely fabricated from permanently magnetic material. In other embodiments, mirror pivot 706 includes one or more components fabricated from permanently magnetic material and one or more components fabricated from non-magnetic material. The mirror pivot 706 is moveably mounted to the magnet mount post 704. In some embodiments, a mirror 707 is fixedly mounted to the mirror pivot 706. In some embodiments, one or more magnetic coils 710 is fixedly mounted to the base member 702, for providing one or more magnetic forces to adjust an orientation of the mirror pivot 706.

In some embodiments, a ferrous slug 712 is fixedly mounted to the base member 702 beneath the magnet mount post 704, for attracting and retaining the mirror pivot by means of a magnetic attraction force between the mirror pivot and the ferrous slug 712.

In some embodiments, the mirror pivot 706 is configured as a magnetic barrel component, which is roughly cylindrical with a partially hollow interior having one or more cavities, at least one of which is used for insertion of the magnetic mount post 704. In some embodiments, the magnetic barrel component 706 is moveably mounted to the magnet mount post 704. In some embodiments, the mirror 707 fixedly mounts to the mirror pivot 706. In some embodiments, the magnetic barrel component 706 includes a hollow interior space for mounting to the magnetic mount post 704, and the magnetic barrel component 706 includes a permanent magnet.

In some embodiments, the mirror 707 fixedly mounts to the mirror pivot 706 by means of a mounting post 714, fixedly mounted between the mirror 707 and the mirror pivot 706. In some embodiments, the mirror 707 fixedly mounts directly to the mirror pivot 706, for example by means of an adhesive of a mechanical connection, without the need for mounting post 714b, fixedly mounted between the mirror 707 and the mirror pivot 706. Some embodiments further include Hall sensors 716 for detecting magnetic fields within the actuator 700 as well as a supporting casing 717 and a printed circuit board casing 720 for connecting components such as magnetic coils 710 and Hall sensors 716 for power and signaling.

In some embodiments, four non-moving coils 710 are disposed around four sides of the magnet 706, such that when driven with electric signals delivered through FPC casing 720, the four non-moving coils generate Lorentz forces that tend to tilt the magnet 706 and the mirror 707 about a post 704.

FIG. 8 depicts magnetic fields surrounding a mirror tilt actuator for use with a depth map acquisition system for use in portable multifunction device in accordance with some embodiments, in a centered state. A magnetic coil 822 and magnet 824 are shown with a magnetic field 826 and a vector 828 normal to the surface of the mirror.

Figure 9A:
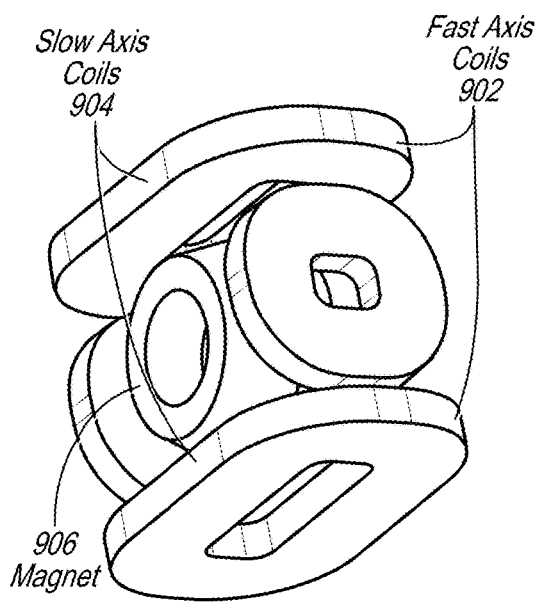
FIG. 9A illustrates components of a mirror tilt actuator for use with a depth map acquisition system for use in portable multifunction device in accordance with some embodiments.

FIG. 9A depicts components of a mirror tilt actuator for use with a depth map acquisition system for use in portable multifunction device in accordance with some embodiments. A pair of fast axis coils 902 and a pair of slow axis coils 904 are arranged around a magnet 906.

Figure 9B:
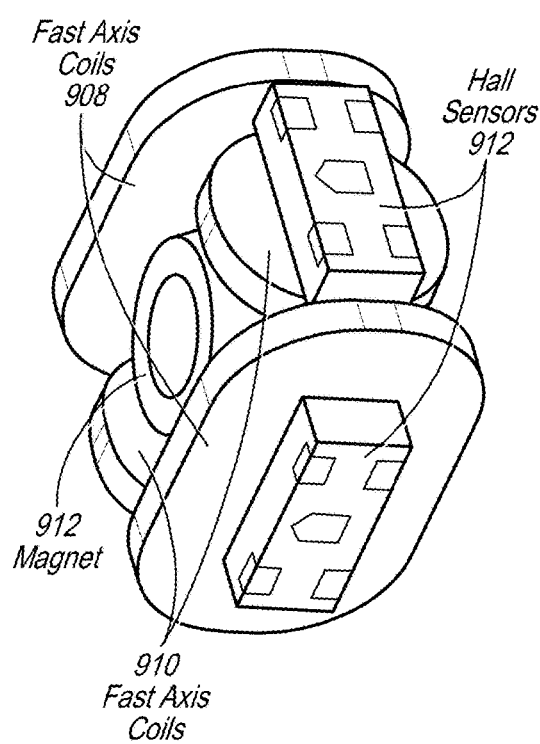
FIG. 9B depicts components of a mirror tilt actuator for use with a depth map acquisition system for use in portable multifunction device in accordance with some embodiments.

FIG. 9B illustrates components of a mirror tilt actuator for use with a depth map acquisition system for use in portable multifunction device in accordance with some embodiments. A pair of fast axis coils 908 and a pair of slow axis coils 910 are arranged around a magnet 912. A pair of Hall sensors 912 is shown.

Figure 9C:
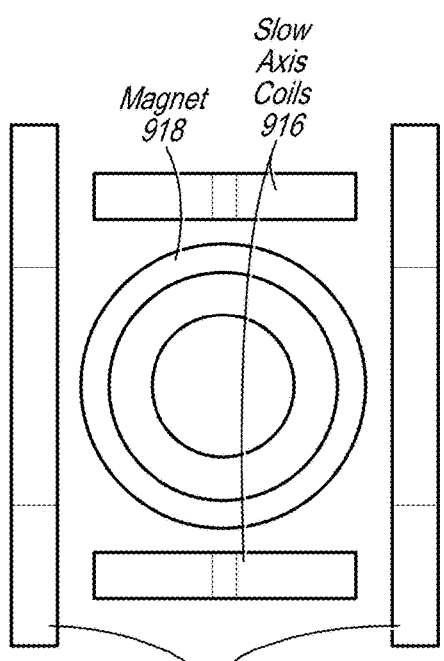
FIG. 9C illustrates components of a mirror tilt actuator for use with a depth map acquisition system for use in portable multifunction device in accordance with some embodiments.

FIG. 9C depicts components of a mirror tilt actuator for use with a depth map acquisition system for use in portable multifunction device in accordance with some embodiments. A pair of fast axis coils 914 and a pair of slow axis coils 916 are arranged around a magnet 918.

Figure 10:
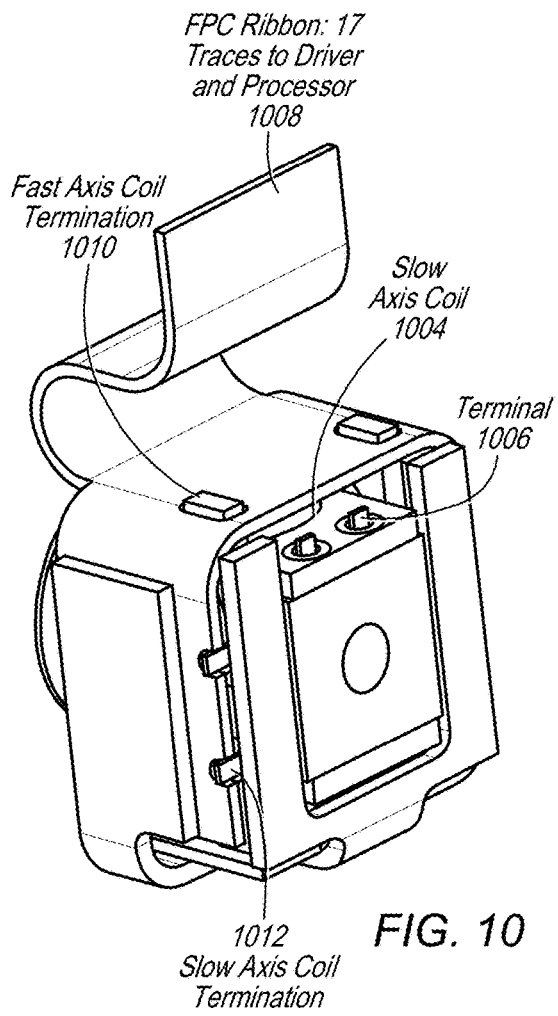
FIG. 10 depicts components of a mirror tilt actuator for use with a depth map acquisition system for use in portable multifunction device in accordance with some embodiments.

FIG. 10 illustrates components of a mirror tilt actuator for use with a depth map acquisition system for use in portable multifunction device in accordance with some embodiments. Slow axis coil termination 1002, a slow-axis coil 1004, a terminal 1006, an FPC (flexible printed circuit) ribbon with traces to a driver and processor 1008 and a fast-axis coil termination 1010 are shown.

Figure 11A:
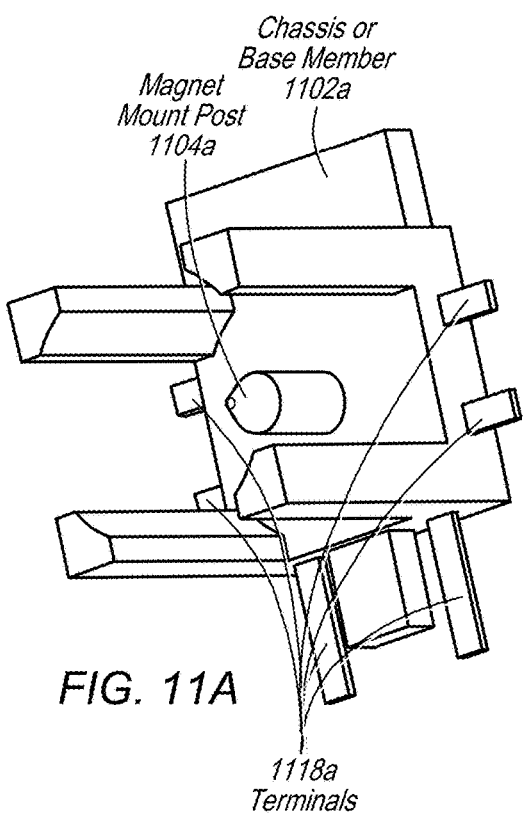
FIG. 11A illustrates components of a mirror tilt actuator for use with a depth map acquisition system for use in portable multifunction device in accordance with some embodiments.

FIG. 11A illustrates components of a mirror tilt actuator for use with a depth map acquisition system for use in portable multifunction device in accordance with some embodiments. A chassis or base member 1102a is shown with a magnet mount post 1104a and terminals 1118a.

Figure 11B:
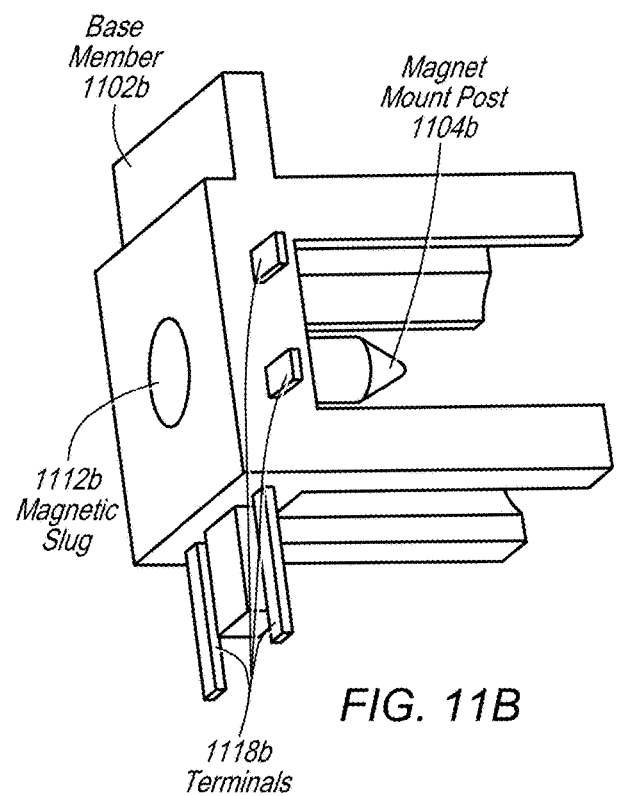
FIG. 11B depicts components of a mirror tilt actuator for use with a depth map acquisition system for use in portable multifunction device in accordance with some embodiments.

FIG. 11B depicts components of a mirror tilt actuator for use with a depth map acquisition system for use in portable multifunction device in accordance with some embodiments. A chassis or base member 1102b is shown with a magnet mount post 1104b and terminals 1118b. A magnetic slug 1112b is also visible.

Figure 12:
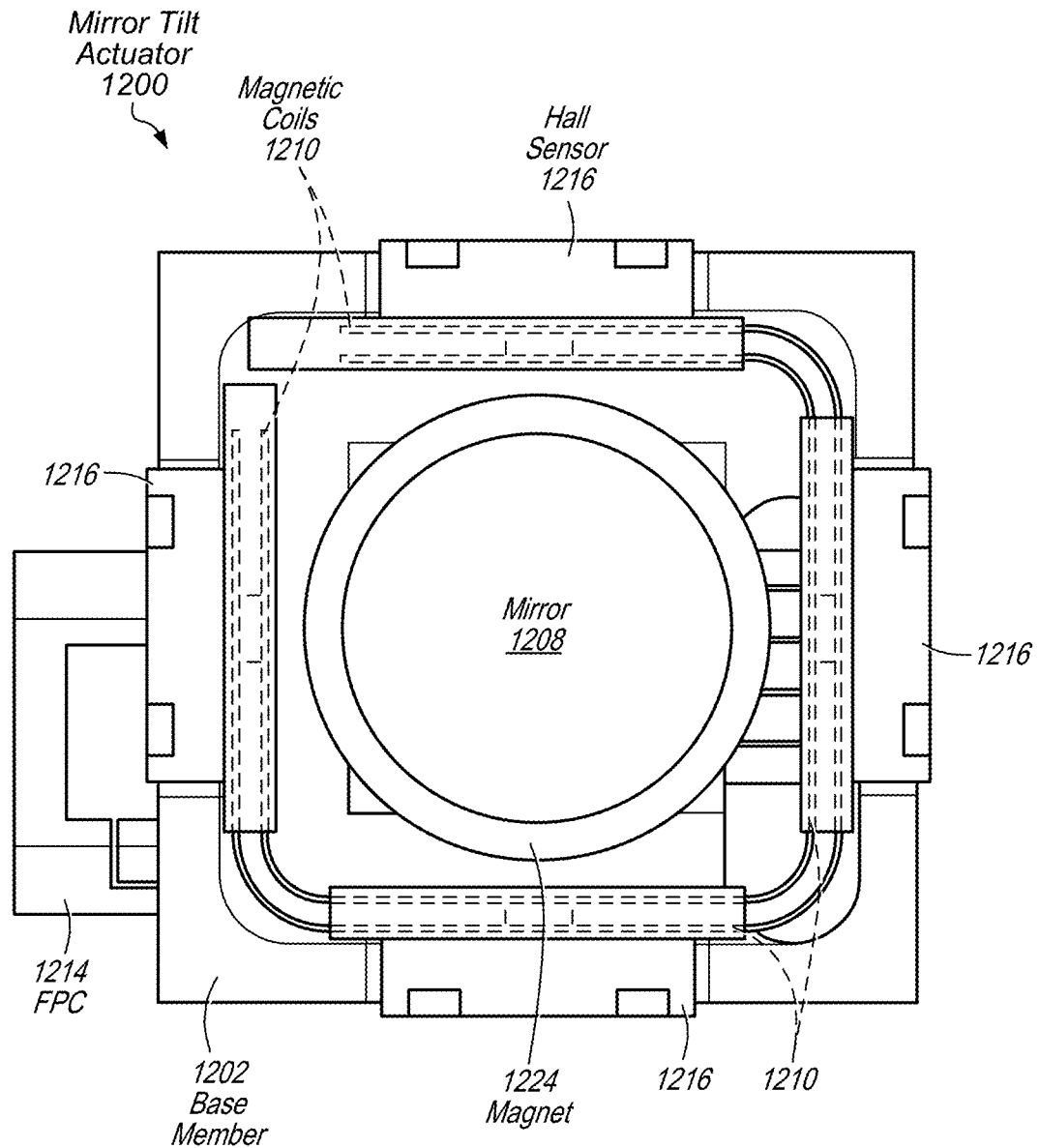
FIG. 12 illustrates a mirror tilt actuator for use with a depth map acquisition system for use in portable multifunction device in accordance with some embodiments.

FIG. 12 illustrates a mirror tilt actuator for use with a depth map acquisition system for use in portable multifunction device in accordance with some embodiments. A mirror tilt actuator 1200 includes a base member 1202, which is fixedly mounted to a housing such as supporting casing (not shown).

A magnet mount post (not shown) is fixedly mounted to the base member 1302, for mounting a mirror pivot (magnet 1224), which in some embodiments includes a magnetic component. In some embodiments mirror pivot (magnet 1224) is entirely fabricated from permanently magnetic material. In other embodiments, mirror pivot (magnet 1224) includes one or more components fabricated from permanently magnetic material and one or more components fabricated from non-magnetic material. The mirror pivot (magnet 1224) is moveably mounted to the magnet mount post (not shown). In some embodiments, a mirror 1208 is fixedly mounted to the mirror pivot (magnet 1224). In some embodiments, one or more magnetic coils 1210 is fixedly mounted to the base member 1202, for providing one or more magnetic forces to adjust an orientation of the mirror pivot (magnet 1224).

In some embodiments, a ferrous slug (not shown) is fixedly mounted to the base member 1202 beneath the magnet mount post (not shown), for attracting and retaining the mirror pivot (magnet 1224) by means of a magnetic attraction force between the mirror pivot (magnet 1224) and the ferrous slug (not shown).

In some embodiments, the mirror pivot 506 (magnet 1224) is configured as a magnetic barrel component, which is roughly cylindrical with a partially hollow interior having one or more cavities, at least one of which is used for insertion of the magnetic mount post (not shown). In some embodiments, the magnetic barrel component (magnet 1224) is moveably mounted to the magnet mount post (not shown). In some embodiments, the mirror 1208 fixedly mounts to the mirror pivot (not shown). In some embodiments, the magnetic barrel component (not shown) includes a hollow interior space (not shown) for mounting to the magnetic mount post (not shown), and the magnetic barrel component (magnet 1224) includes a permanent magnet.

In some embodiments, the mirror 1208 fixedly mounts to the mirror pivot (magnet 1224) by means of a mounting post (not used in the embodiments shown in FIG. 12), fixedly mounted between the mirror 1208 and the mirror pivot (magnet 1224). In some embodiments, the mirror 1208 fixedly mounts directly to the mirror pivot (magnet 1224), for example by means of an adhesive of a mechanical connection, without the need for a mounting post, fixedly mounted between the mirror 1208 and the mirror pivot (magnet 1224). Some embodiments further include Hall sensors 1216 for detecting magnetic fields within the actuator 1200 as well as a supporting casing (not shown) and a flexible printed circuit 1214 for connecting components such as magnetic coils 1210 and Hall sensors 1216 for power and signaling.

In some embodiments, four non-moving coils 1216 are disposed around four sides of the magnet 1224, such that when driven with electric signals delivered through FPC 1214, the four non-moving coils 1216 generate Lorentz forces that tend to tilt the magnet 1224 and the mirror 1208 about a post (not shown).

Figure 13:
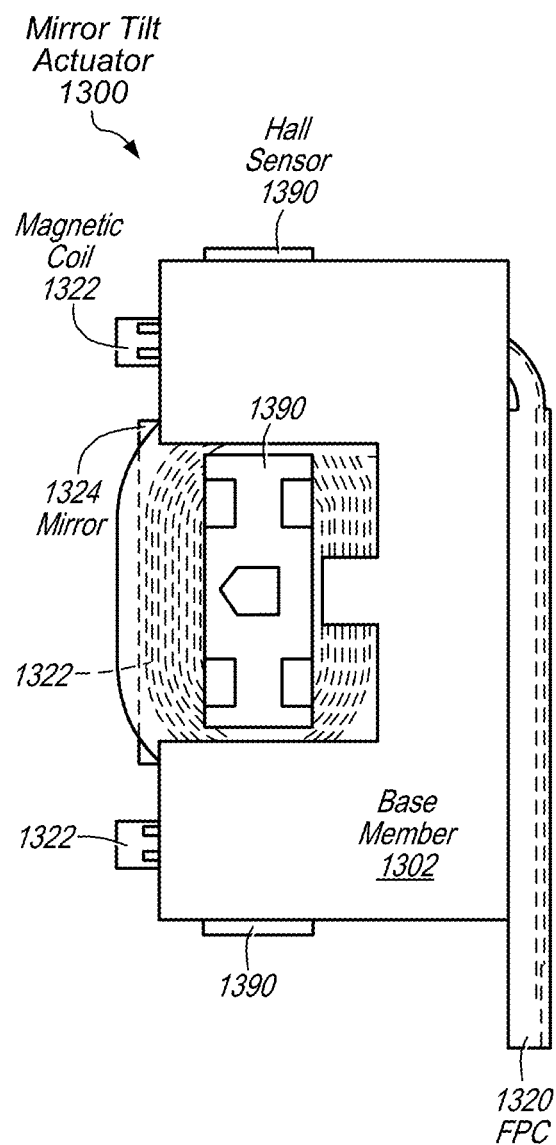
FIG. 13 depicts a mirror tilt actuator for use with a depth map acquisition system for use in portable multifunction device in accordance with some embodiments.

FIG. 13 depicts a mirror tilt actuator for use with a depth map acquisition system for use in portable multifunction device in accordance with some embodiments. A mirror tilt actuator 1300 includes a base member 1302, which is fixedly mounted to a housing such as supporting casing (not shown).

A magnet mount post (not shown) is fixedly mounted to the base member 1302, for mounting a mirror pivot (not shown), which in some embodiments includes a magnetic component. In some embodiments mirror pivot (not shown) is entirely fabricated from permanently magnetic material. In other embodiments, mirror pivot (not shown) includes one or more components fabricated from permanently magnetic material and one or more components fabricated from non-magnetic material. The mirror pivot (not shown) is moveably mounted to the magnet mount post (not shown). In some embodiments, a mirror 1324 is fixedly mounted to the mirror pivot (not shown). In some embodiments, one or more magnetic coils 1322 is fixedly mounted to the base member (not shown), for providing one or more magnetic forces to adjust an orientation of the mirror pivot (not shown).

Some embodiments further include Hall sensors 1390 for detecting magnetic fields within the actuator 1300 as well and a flexible printed circuit 1320 for connecting components such as magnetic coils 1322 and Hall sensors 1390 for power and signaling.

Figure 14:
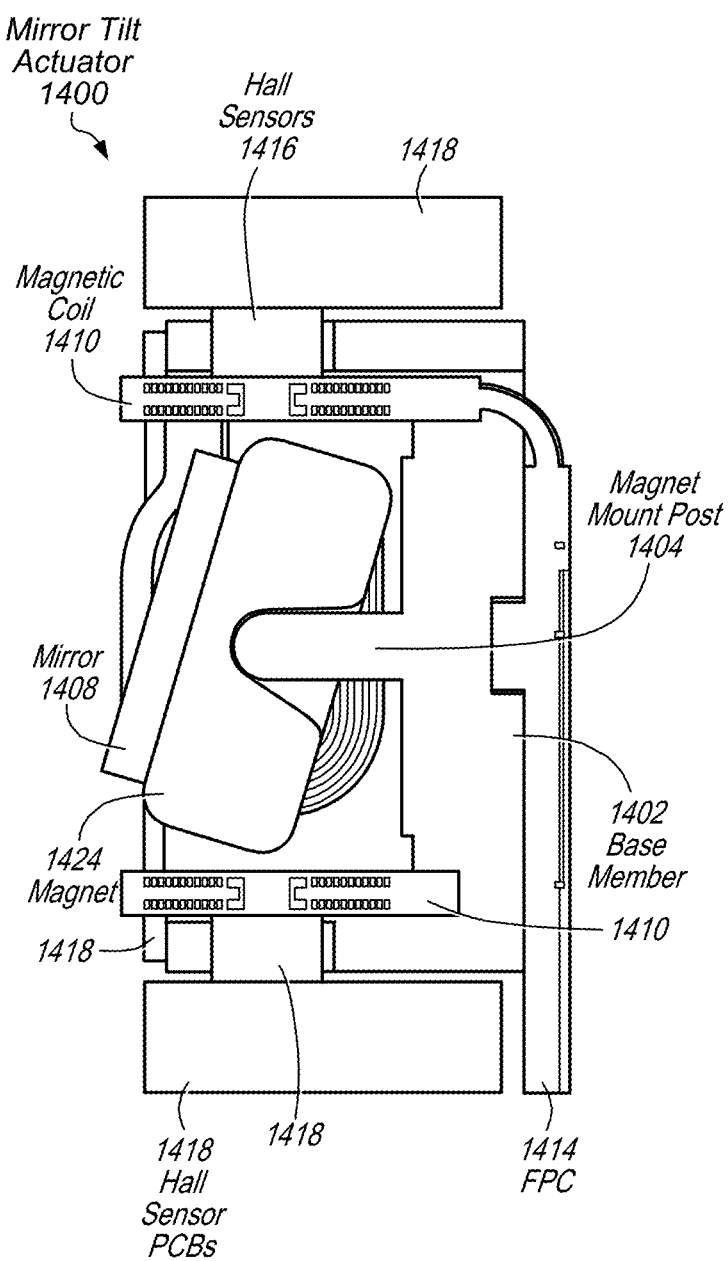
FIG. 14 illustrates a mirror tilt actuator for use with a depth map acquisition system for use in portable multifunction device in accordance with some embodiments.

FIG. 14 illustrates a mirror tilt actuator for use with a depth map acquisition system for use in portable multifunction device in accordance with some embodiments. A mirror tilt actuator 1400 includes a base member 1402, which is fixedly mounted to a housing such as supporting casing (not shown).

A magnet mount post 1404 is fixedly mounted to the base member 1402, for mounting a mirror pivot (magnet 1424), which in some embodiments includes a magnetic component. In some embodiments mirror pivot (magnet 1424) is entirely fabricated from permanently magnetic material. In other embodiments, mirror pivot (magnet 1424) includes one or more components fabricated from permanently magnetic material and one or more components fabricated from non-magnetic material. The mirror pivot (magnet 1424) is moveably mounted to the magnet mount post 1404. In some embodiments, a mirror 1408 is fixedly mounted to the mirror pivot 1424. In some embodiments, one or more magnetic coils 1410 is fixedly mounted to the base member 1402, for providing one or more magnetic forces to adjust an orientation of the mirror pivot (magnet 1424).

Some embodiments further include Hall sensors 1416 mounted to Hall sensor PCBs 1418 for detecting magnetic fields within the actuator 1400 as well and a flexible printed circuit 1414 for connecting components such as magnetic coils 1410 and Hall sensors 1416 for power and signaling.

Figure 15:
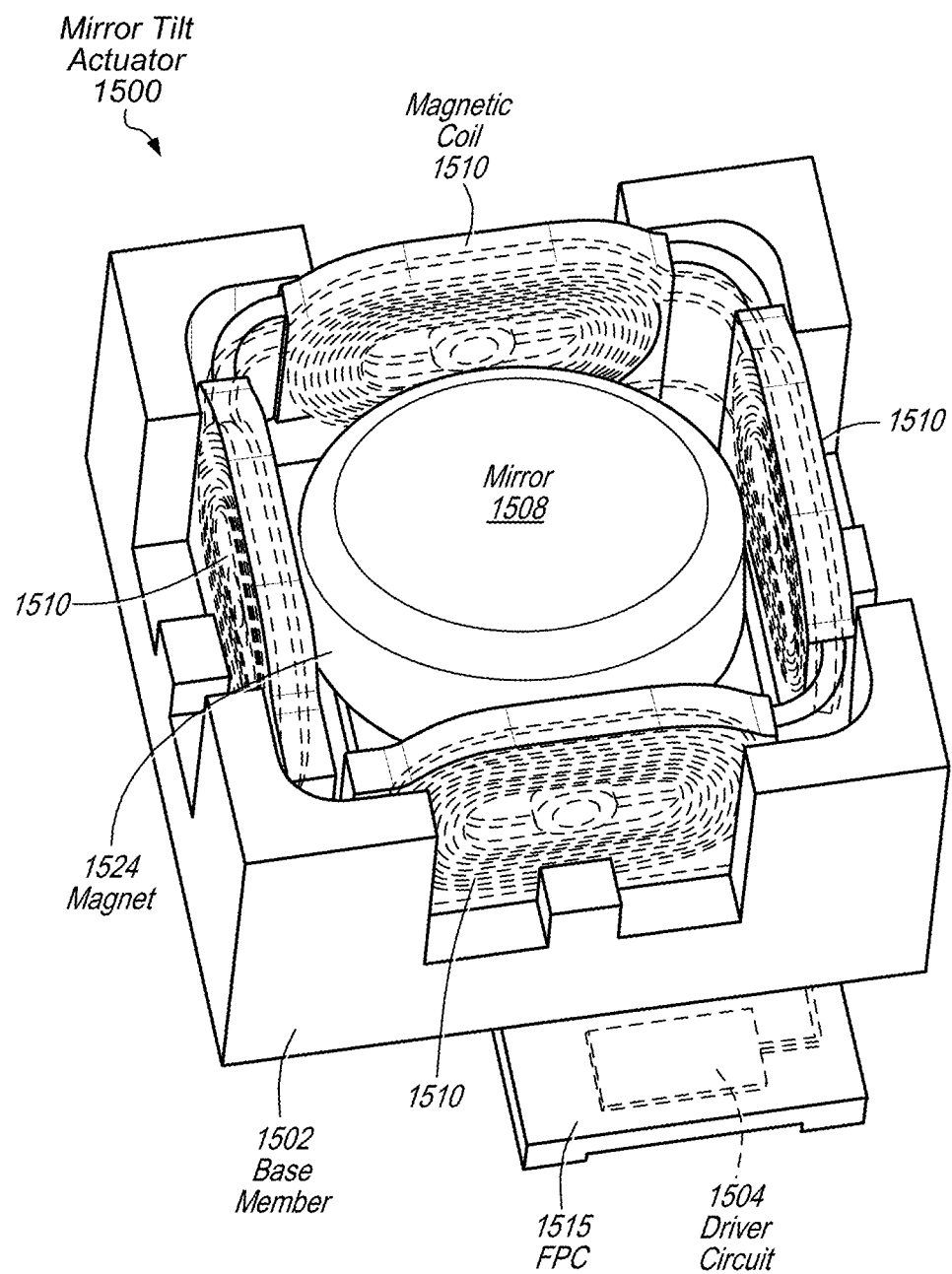
FIG. 15 depicts a mirror tilt actuator for use with a depth map acquisition system for use in portable multifunction device in accordance with some embodiments.

FIG. 15 depicts a mirror tilt actuator for use with a depth map acquisition system for use in portable multifunction device in accordance with some embodiments. A mirror tilt actuator 1500 includes a base member 1502, which is fixedly mounted to a housing such as supporting casing (not shown).

A magnet mount post (not shown) is fixedly mounted to the base member 1502, for mounting a mirror pivot (magnet 1524), which in some embodiments includes a magnetic component. In some embodiments mirror pivot (magnet 1524) is entirely fabricated from permanently magnetic material. In other embodiments, mirror pivot (magnet 1524) includes one or more components fabricated from permanently magnetic material and one or more components fabricated from non-magnetic material. The mirror pivot (magnet 1524) is moveably mounted to the magnet mount post (not shown). In some embodiments, a mirror 1508 is fixedly mounted to the mirror pivot (magnet 1524). In some embodiments, one or more magnetic coils 1510 is fixedly mounted to the base member (not shown), for providing one or more magnetic forces to adjust an orientation of the mirror pivot (magnet 1524).

Some embodiments further include Hall sensors (not shown) for detecting magnetic fields within the actuator 1500 as well and a flexible printed circuit 1515 for connecting components such as magnetic coils 1510 and Hall sensors (not shown) to a driver circuit 1504 for power and signaling.

Figure 16:
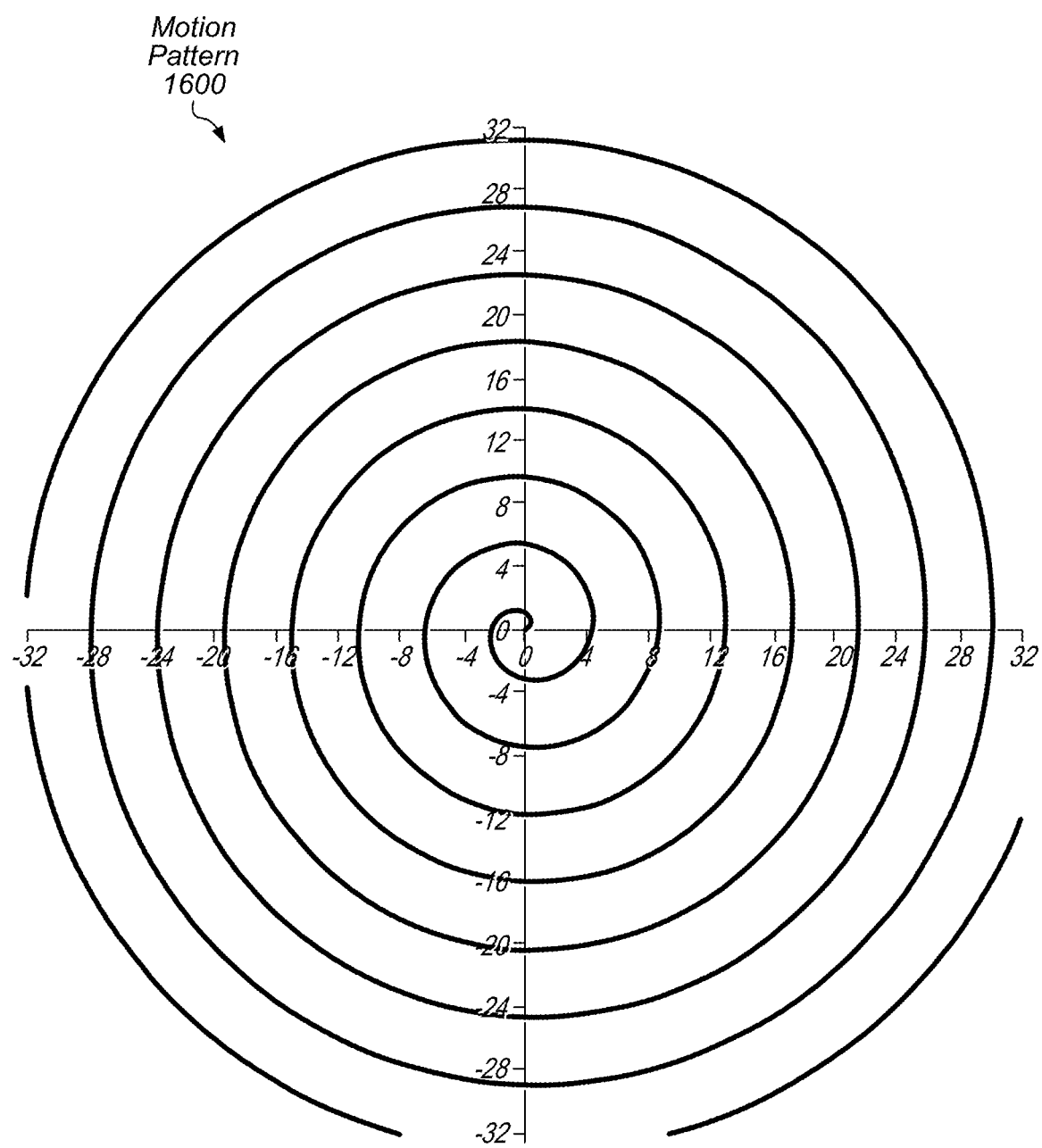
FIG. 16 illustrates motion during operation of a mirror tilt actuator for use with a depth map acquisition system for use in portable multifunction device in accordance with some embodiments.

FIG. 16 illustrates operation of a mirror tilt actuator for use with a depth map acquisition system for use in portable multifunction device in accordance with some embodiments. Some embodiments move the mirror in a spiral motion pattern 1600 to provide coverage of an area in a depth map.

Figure 17:
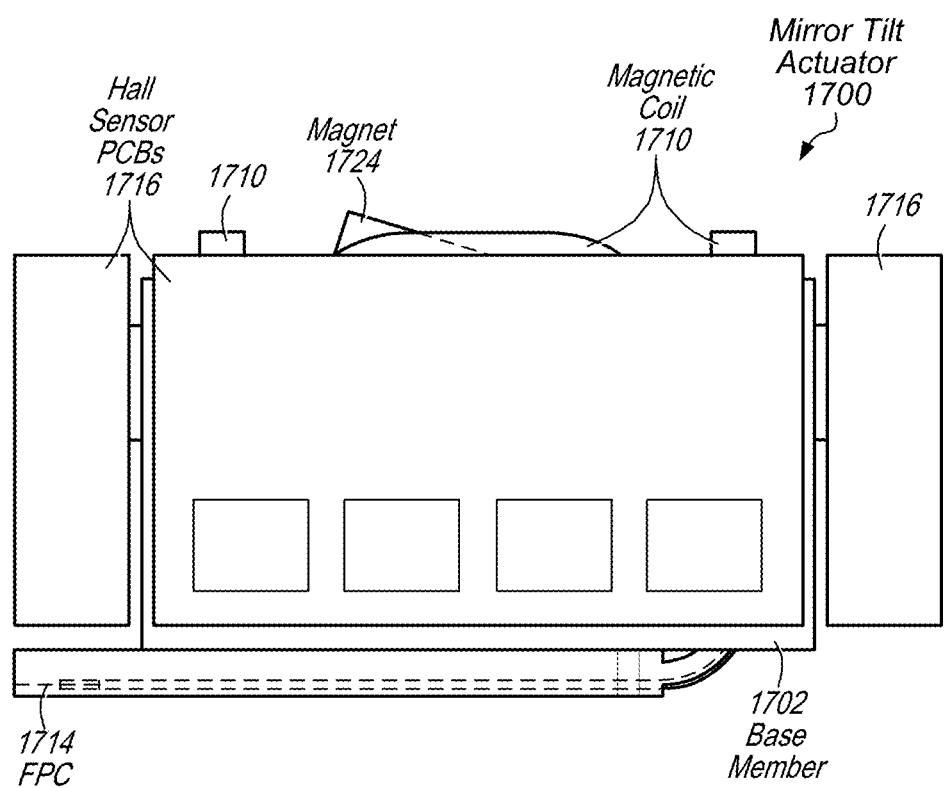
FIG. 17 depicts a mirror tilt actuator for use with a depth map acquisition system for use in portable multifunction device in accordance with some embodiments.

FIG. 17 depicts a schematic of a mirror tilt actuator for use with a depth map acquisition system for use in portable multifunction device in accordance with some embodiments. A mirror tilt actuator 1700 includes a base member 1702, which is fixedly mounted to a housing such as supporting casing (not shown).

A magnet mount post (not shown) is fixedly mounted to the base member 1702, for mounting a mirror pivot (magnet 1724), which in some embodiments includes a magnetic component. In some embodiments mirror pivot (magnet 1724) is entirely fabricated from permanently magnetic material. In other embodiments, mirror pivot (magnet 1724) includes one or more components fabricated from permanently magnetic material and one or more components fabricated from non-magnetic material. The mirror pivot (magnet 1724) is moveably mounted to the magnet mount post (not shown). In some embodiments, a mirror (not shown) is fixedly mounted to the mirror pivot 1724. In some embodiments, one or more magnetic coils 1710 is fixedly mounted to the base member 1702, for providing one or more magnetic forces to adjust an orientation of the mirror pivot (magnet 1724).

Some embodiments further include Hall sensors (not shown) mounted to Hall sensor PCBs 1718 for detecting magnetic fields within the actuator 1700 and a flexible printed circuit 1714 for connecting components such as magnetic coils 1710 and Hall sensors (not shown) for power and signaling.

Figure 18:
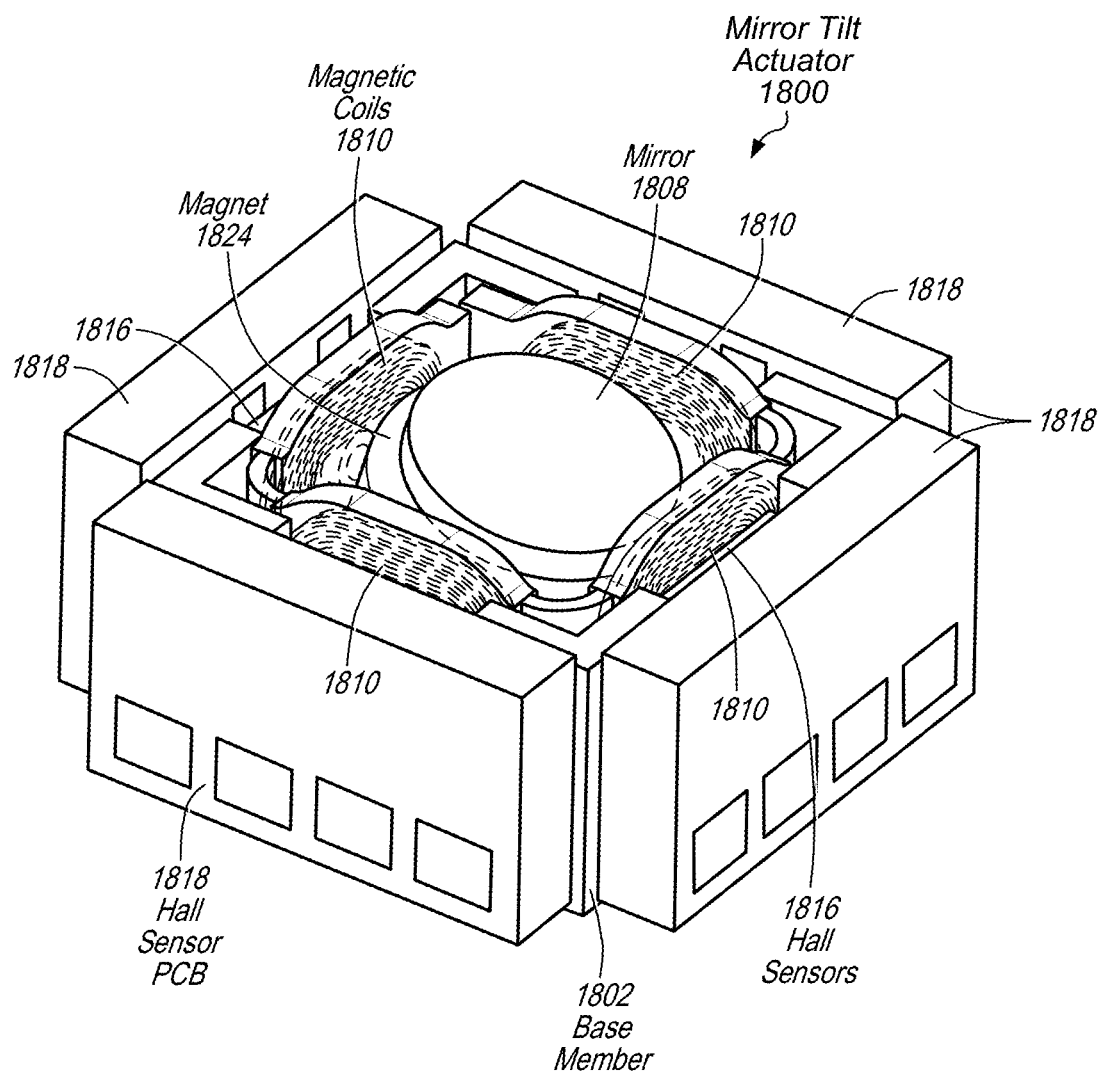
FIG. 18 illustrates a mirror tilt actuator for use with a depth map acquisition system for use in portable multifunction device in accordance with some embodiments.

FIG. 18 illustrates a mirror tilt actuator for use with a depth map acquisition system for use in portable multifunction device in accordance with some embodiments. A mirror tilt actuator 1800 includes a base member 1802.

A magnet mount post (not shown) is fixedly mounted to the base member 1802, for mounting a mirror pivot (magnet 1824), which in some embodiments includes a magnetic component. In some embodiments mirror pivot (magnet 1824) is entirely fabricated from permanently magnetic material. In other embodiments, mirror pivot (magnet 1824) includes one or more components fabricated from permanently magnetic material and one or more components fabricated from non-magnetic material. The mirror pivot (magnet 1824) is moveably mounted to the magnet mount post (not shown). In some embodiments, a mirror 1808 is fixedly mounted to the mirror pivot 1824. In some embodiments, one or more magnetic coils 1810 is fixedly mounted to the base member 1802, for providing one or more magnetic forces to adjust an orientation of the mirror pivot (magnet 1824).

Some embodiments further include Hall sensors 1816 mounted to Hall sensor PCBs 1818 for detecting magnetic fields within the actuator 1800 as well and a flexible printed circuit (not shown) for connecting components such as magnetic coils 1810 and Hall sensors 1816 for power and signaling.

Figure 19:
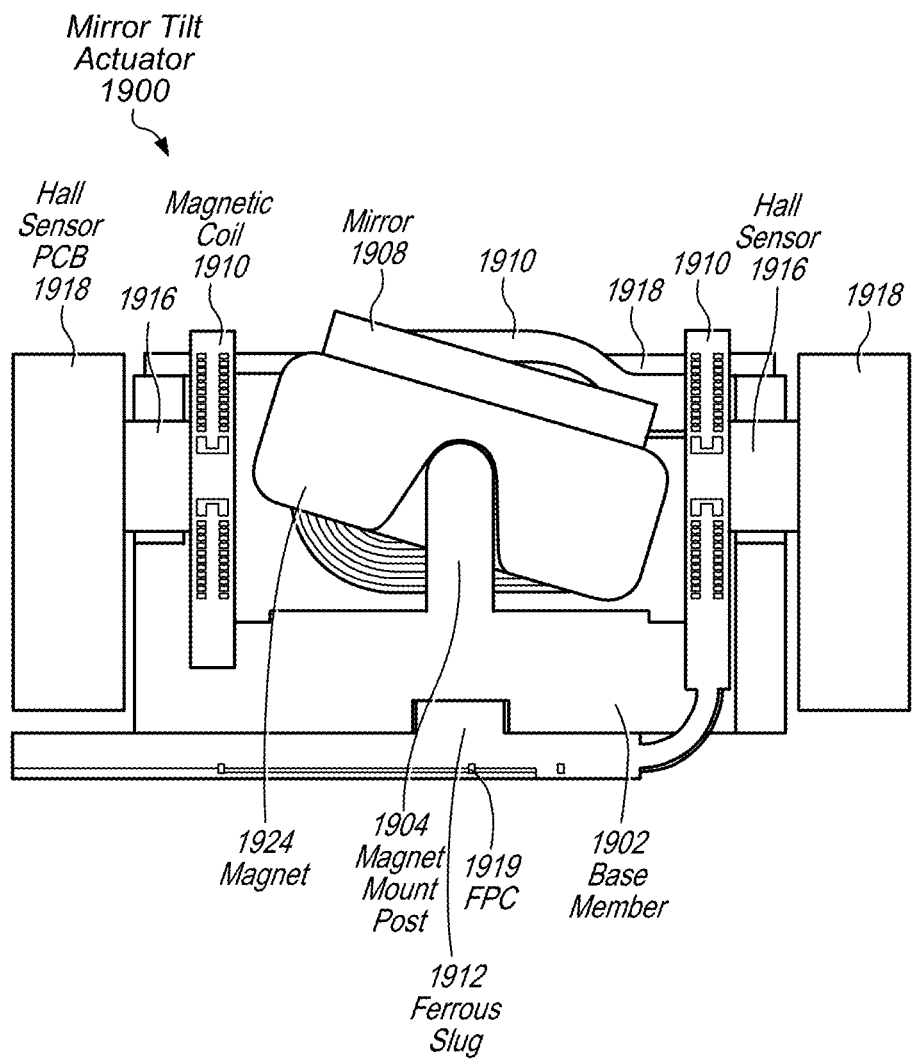
FIG. 19 depicts a mirror tilt actuator for use with a depth map acquisition system for use in portable multifunction device in accordance with some embodiments.

FIG. 19 depicts a mirror tilt actuator for use with a depth map acquisition system for use in portable multifunction device in accordance with some embodiments. A mirror tilt actuator 1900 includes a base member 1902.

A magnet mount post with a rounded tip 1904 is fixedly mounted to the base member 1902, for mounting a mirror pivot (magnet 1924), which in some embodiments includes a magnetic component. In some embodiments mirror pivot (magnet 1924) is entirely fabricated from permanently magnetic material. In other embodiments, mirror pivot (magnet 1924) includes one or more components fabricated from permanently magnetic material and one or more components fabricated from non-magnetic material. The mirror pivot (magnet 1924) is moveably mounted to the magnet mount post 1904. In some embodiments, a mirror 1908 is fixedly mounted to the mirror pivot 1924. In some embodiments, one or more magnetic coils 1910 is fixedly mounted to the base member 1902, for providing one or more magnetic forces to adjust an orientation of the mirror pivot (magnet 1924).

Some embodiments further include Hall sensors 1916 mounted to Hall sensor PCBs 1918 for detecting magnetic fields within the actuator 1900 as well and a flexible printed circuit 1919 for connecting components such as magnetic coils 1910 and Hall sensors 1916 for power and signaling. A ferrous slug 1910 is included for attracting magnet 1924 to hold it in place within actuator 1900.

Example Operations

Figure 20:
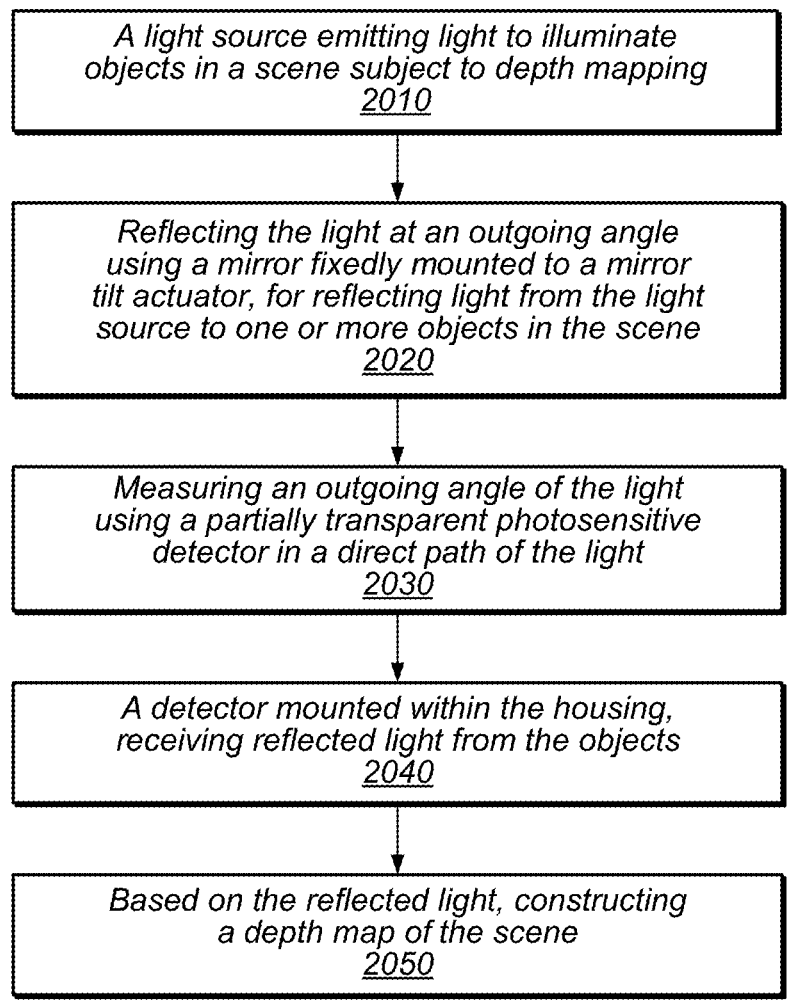
FIG. 20 is a flow diagram illustrating one embodiment of a method for operating a depth map acquisition system according to some embodiments.

FIG. 20 is a flow diagram illustrating one embodiment of a method for operating a depth map acquisition system according to some embodiments. A light source emits light to illuminate objects in a scene subject to depth mapping (2010). The light is reflected at an outgoing angle using a mirror fixedly mounted to a mirror tilt actuator, for reflecting light from the light source to one or more objects in the scene (2020). An outgoing angle of the light using a partially transparent photosensitive detector in a direct path of the light (2030). A detector mounted within the housing receives reflected light from the objects (2040). Based on the reflected light, a depth map of the scene is constructed (2050).

Figure 21:
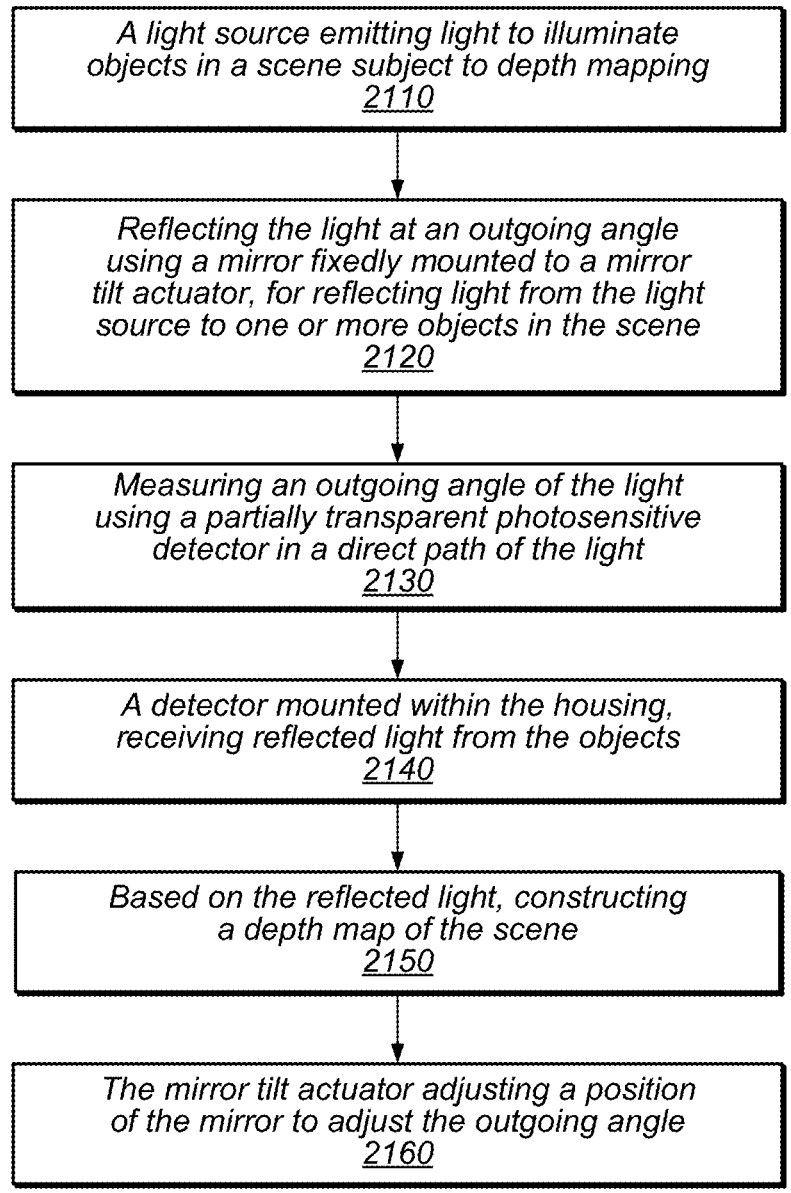
FIG. 21 is a flow diagram illustrating one embodiment of a method for operating a depth map acquisition system according to some embodiments.

FIG. 21 is a flow diagram illustrating one embodiment of a method for operating a depth map acquisition system according to some embodiments. A light source emitting light to illuminate objects in a scene subject to depth mapping (2110). The light is reflected at an outgoing angle using a mirror fixedly mounted to a mirror tilt actuator, for reflecting light from the light source to one or more objects in the scene (2120). An outgoing angle of the light is measured using a partially transparent photosensitive detector in a direct path of the light (2130). A detector mounted within the housing, receives reflected light from the objects (2140). Based on the reflected light, a depth map of the scene is constructed (2150). The mirror tilt actuator adjusts a position of the mirror to adjust the outgoing angle (2160).

Figure 22:
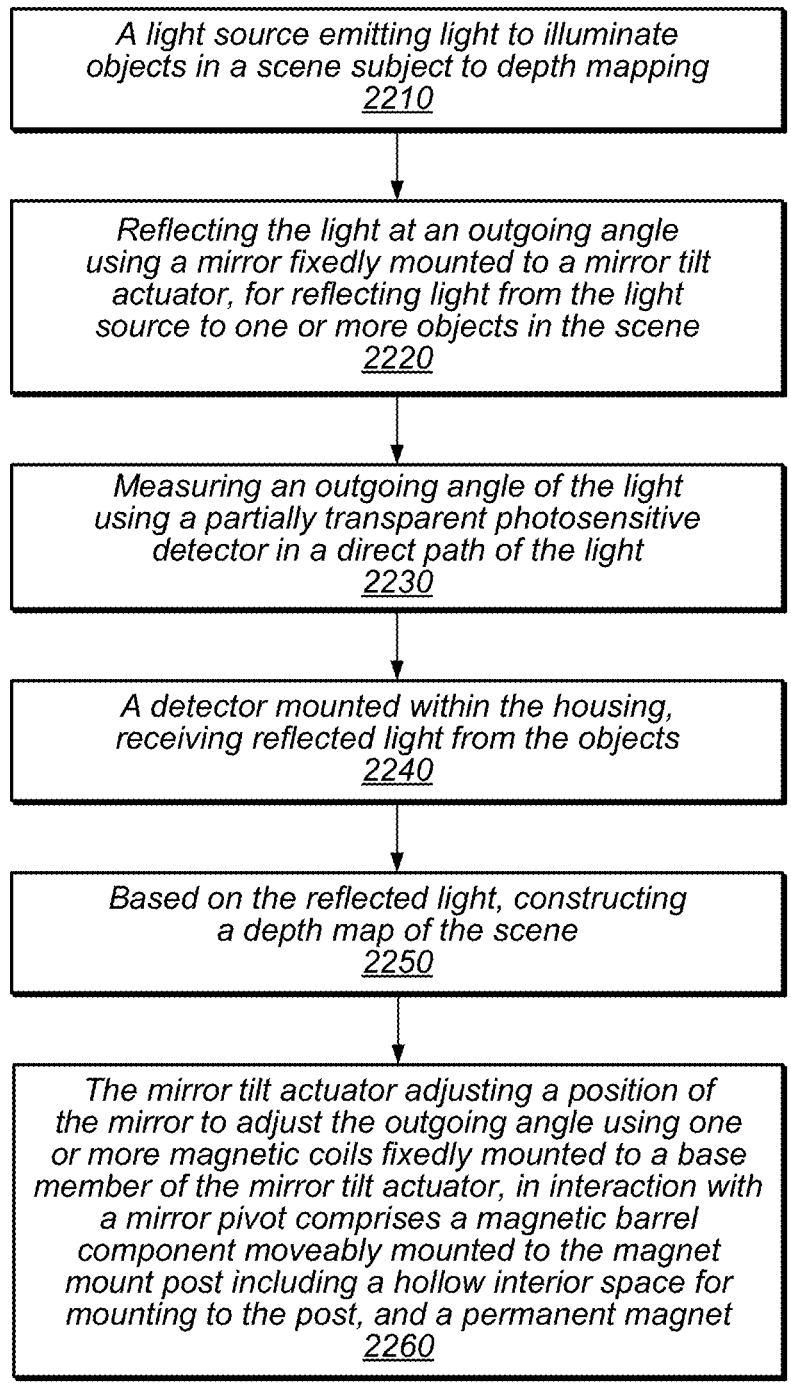
FIG. 22 is a flow diagram illustrating one embodiment of a method for operating a depth map acquisition system according to some embodiments.

FIG. 22 is a flow diagram illustrating one embodiment of a method for operating a depth map acquisition system according to some embodiments. A light source emits light to illuminate objects in a scene subject to depth mapping (2210). The light is reflected at an outgoing angle using a mirror fixedly mounted to a mirror tilt actuator, for reflecting light from the light source to one or more objects in the scene (2220). An outgoing angle of the light is measured using a partially transparent photosensitive detector in a direct path of the light (2230). A detector mounted within the housing receives reflected light from the objects (2240). Based on the reflected light, a depth map of the scene is constructed (2250). The mirror tilt actuator adjusts a position of the mirror to adjust the outgoing angle using one or more magnetic coils fixedly mounted to a base member of the mirror tilt actuator, in interaction with a mirror pivot comprises a magnetic barrel component moveably mounted to the magnet mount post including a hollow interior space for mounting to the post, and a permanent magnet (2260).

Figure 23:
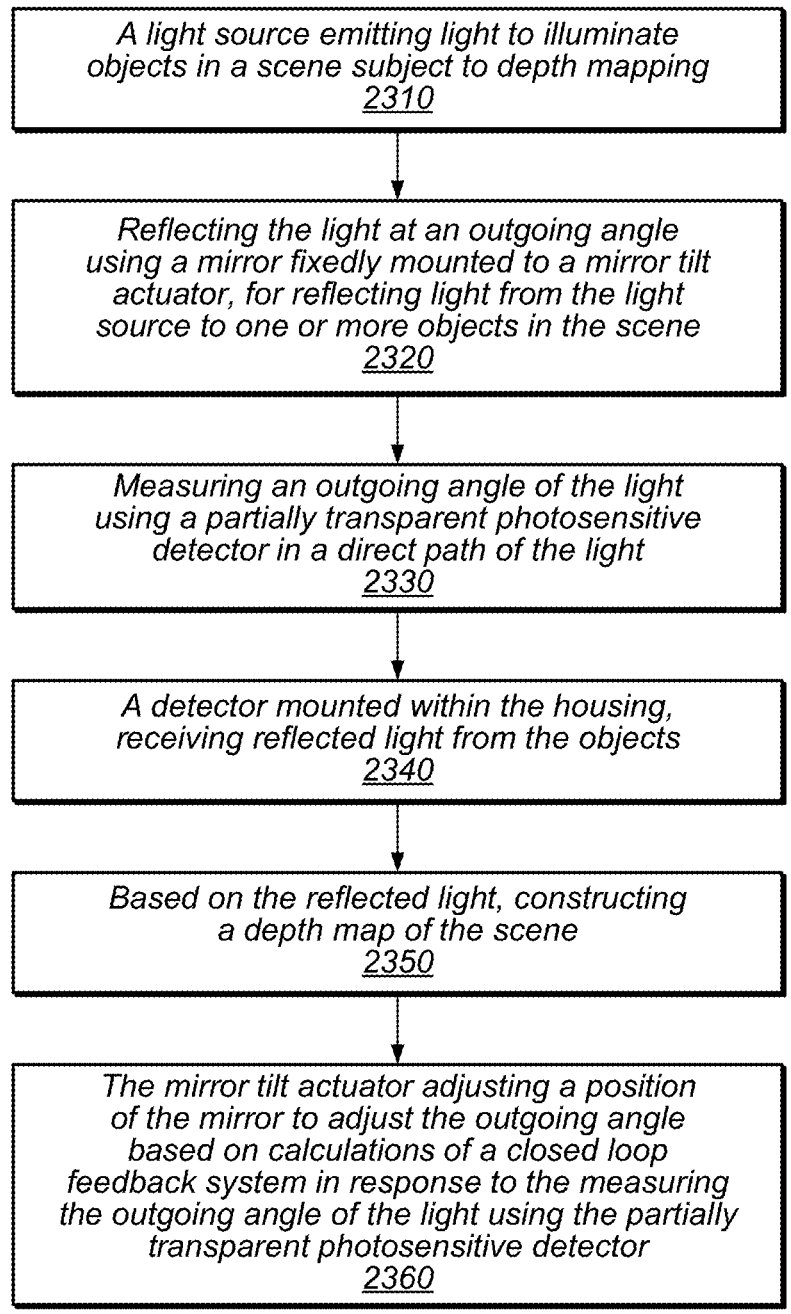
FIG. 23 is a flow diagram illustrating one embodiment of a method for operating a depth map acquisition system according to some embodiments.

FIG. 23 is a flow diagram illustrating one embodiment of a method for operating a depth map acquisition system according to some embodiments. A light source emits light to illuminate objects in a scene subject to depth mapping (2310). The light is reflected at an outgoing angle using a mirror fixedly mounted to a mirror tilt actuator, for reflecting light from the light source to one or more objects in the scene (2320). An outgoing angle of the light is measured using a partially transparent photosensitive detector in a direct path of the light (2330). A detector mounted within the housing receives reflected light from the objects (2340). Based on the reflected light, a depth map of the scene is constructed (2350). The mirror tilt actuator adjusts a position of the mirror to adjust the outgoing angle based on calculations of a closed loop feedback system in response to the measuring the outgoing angle of the light using the partially transparent photosensitive detector (2360).

Figure 24:
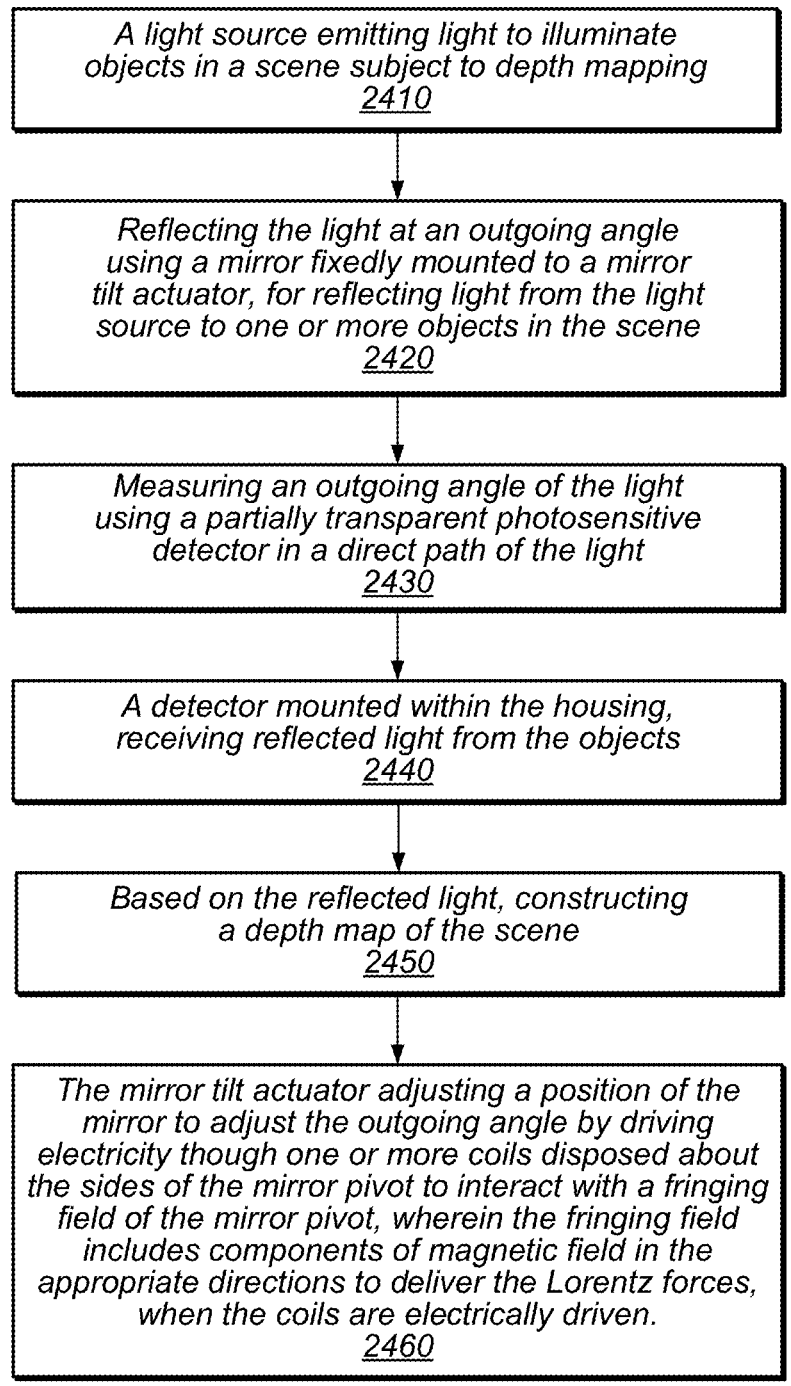
FIG. 24 is a flow diagram illustrating one embodiment of a method for operating a depth map acquisition system according to some embodiments.

FIG. 24 is a flow diagram illustrating one embodiment of a method for operating a depth map acquisition system according to some embodiments. A light source emits light to illuminate objects in a scene subject to depth mapping (2410). The light is reflected at an outgoing angle using a mirror fixedly mounted to a mirror tilt actuator, for reflecting light from the light source to one or more objects in the scene (2420). An outgoing angle of the light is measured using a partially transparent photosensitive detector in a direct path of the light (2430). A detector mounted within the housing, receives reflected light from the objects (2440). Based on the reflected light, a depth map of the scene is constructed (2450). The mirror tilt actuator adjusts a position of the mirror to adjust the outgoing angle by driving electricity though one or more coils disposed about the sides of the mirror pivot to interact with a fringing field of the mirror pivot, wherein the fringing field includes components of magnetic field in the appropriate directions to deliver the Lorentz forces, when the coils are electrically driven. (2460).

Example Computer System

Figure 25:
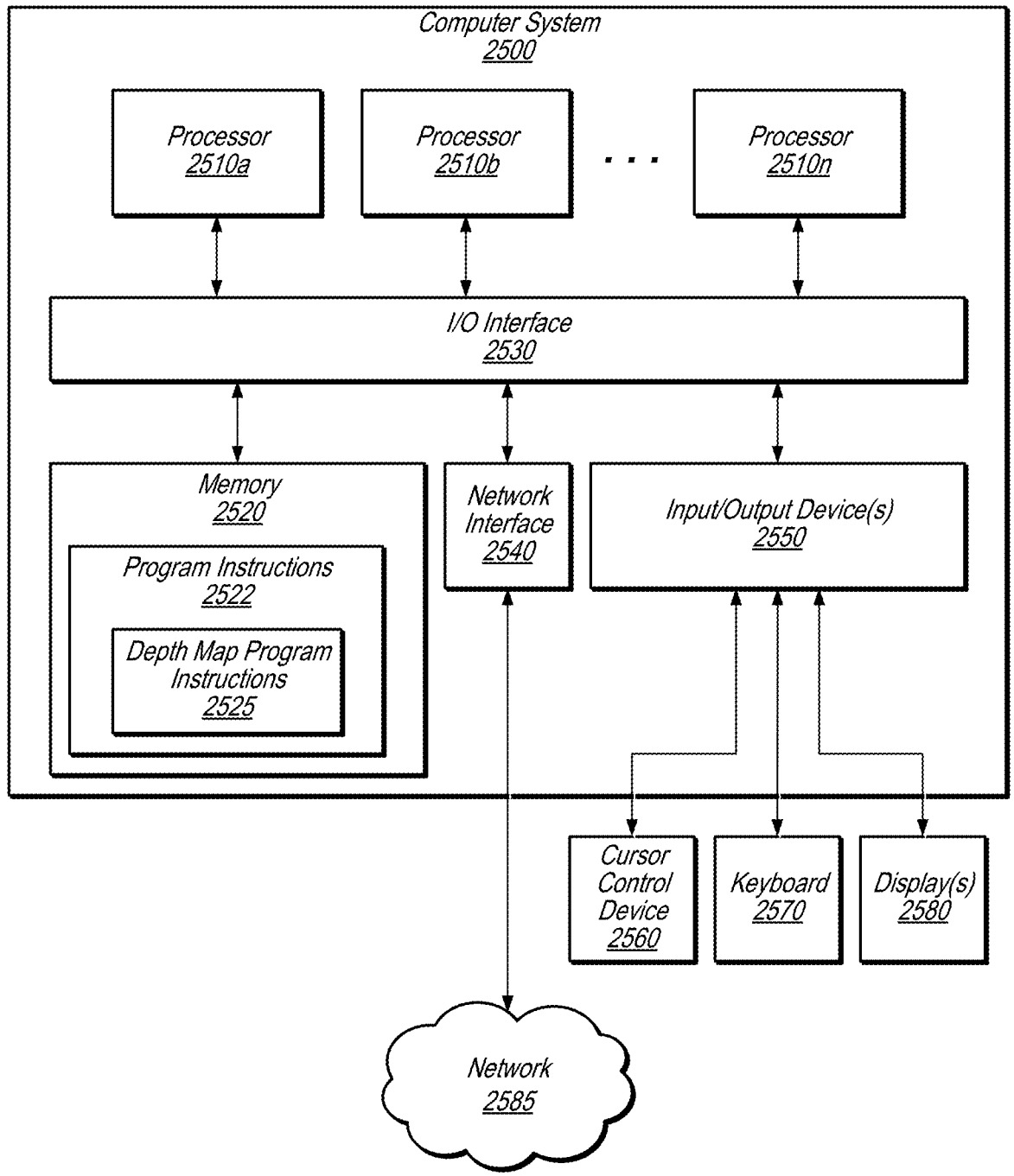
FIG. 25 illustrates an example computer system configured to implement aspects of the system and method for depth map acquisition.

FIG. 25 illustrates computer system 2500 that is configured to execute or control any or all of the embodiments described above, especially when embodied as depth map program instructions 2525 or program instructions 2522. In different embodiments, computer system 2500 may be any of various types of devices, including, but not limited to, a computer embedded in a vehicle, a computer embedded in an appliance, a personal computer system, desktop computer, laptop, notebook, tablet, phone, slate, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a system and method for mirror tilt actuation, as described herein, may be executed on one or more computer systems 2500, which may interact with various other devices. Note that any component, action, or functionality described above with respect to FIGS. 20-24 may be implemented on one or more computers configured as computer system 2500 of FIG. 25, according to various embodiments. In the illustrated embodiment, computer system 2500 includes one or more processors 2510 coupled to a system memory 2520 via an input/output (I/O) interface 2530. Computer system 2500 further includes a network interface 2540 coupled to I/O interface 2530, and one or more input/output devices 2550, such as cursor control device 2560, keyboard 2550, and display(s) 2580. In some cases, it is contemplated that embodiments may be implemented using a single instance of computer system 2500, while in other embodiments multiple such systems, or multiple nodes making up computer system 2500, may be configured to host different portions or instances of embodiments. For example, in one embodiment some elements may be implemented via one or more nodes of computer system 2500 that are distinct from those nodes implementing other elements.

In various embodiments, computer system 2500 may be a uniprocessor system including one processor 2510, or a multiprocessor system including several processors 2510 (e.g., two, four, eight, or another suitable number). Processors 2510 may be any suitable processor capable of executing instructions. For example, in various embodiments processors 2510 may be general-purpose or embedded processors implementing any of a variety of instruction set architectures (ISAs), such as the x86, PowerPC, SPARC, or MIPS ISAs, or any other suitable ISA. In multiprocessor systems, each of processors 2510 may commonly, but not necessarily, implement the same ISA.

System memory 2520 may be configured to store program instructions 2522 and/or existing state information and ownership transition condition data 2525 accessible by processor 2510. In various embodiments, system memory 2520 may be implemented using any suitable memory technology, such as static random access memory (SRAM), synchronous dynamic RAM (SDRAM), nonvolatile/Flash-type memory, or any other type of memory. In the illustrated embodiment, program instructions 2522 may be configured to implement a mapping application 2524 incorporating any of the functionality described above. Additionally, existing state information and ownership transition condition data 2525 of memory 2520 may include any of the information or data structures described above. In some embodiments, program instructions and/or data may be received, sent or stored upon different types of computer-accessible media or on similar media separate from system memory 2520 or computer system 2500. While computer system 2500 is described as implementing the functionality of functional blocks of previous Figures, any of the functionality described herein may be implemented via such a computer system.

In one embodiment, I/O interface 2530 may be configured to coordinate I/O traffic between processor 2510, system memory 2520, and any peripheral devices in the device, including network interface 2540 or other peripheral interfaces, such as input/output devices 2550. In some embodiments, I/O interface 2530 may perform any necessary protocol, timing or other data transformations to convert data signals from one component (e.g., system memory 2520) into a format suitable for use by another component (e.g., processor 2510). In some embodiments, I/O interface 2530 may include support for devices attached through various types of peripheral buses, such as a variant of the Peripheral Component Interconnect (PCI) bus standard or the Universal Serial Bus (USB) standard, for example. In some embodiments, the function of I/O interface 2530 may be split into two or more separate components, such as a north bridge and a south bridge, for example. Also, in some embodiments some or all of the functionality of I/O interface 2530, such as an interface to system memory 2520, may be incorporated directly into processor 2510.

Network interface 2540 may be configured to allow data to be exchanged between computer system 2500 and other devices attached to a network 2585 (e.g., carrier or agent devices) or between nodes of computer system 2500. Network 2585 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 2540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2550 may, in some embodiments, include one or more display terminals, keyboards, keypads, touchpads, scanning devices, voice or optical recognition devices, or any other devices suitable for entering or accessing data by one or more computer systems 2500. Multiple input/output devices 2550 may be present in computer system 2500 or may be distributed on various nodes of computer system 2500. In some embodiments, similar input/output devices may be separate from computer system 2500 and may interact with one or more nodes of computer system 2500 through a wired or wireless connection, such as over network interface 2540.

As shown in FIG. 25, memory 2520 may include program instructions 2522, which may be processor-executable to implement any element or action described above. In one embodiment, the program instructions may implement the methods described above, such as the methods illustrated by FIG. 8. In other embodiments, different elements and data may be included. Note that data 2525 may include any data or information described above.

Those skilled in the art will appreciate that computer system 2500 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 2500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2500 may be transmitted to computer system 2500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A mirror tilt actuator, comprising:
   a base member fixedly mounted to a housing;
   a mount post fixedly mounted to the base member;
   a mirror pivot:
      fixedly mounted to a mirror,
      that comprises one or more magnetic components, and
      that is moveably retained on the mount post, wherein a magnetic force of one or more of the magnetic components of the mirror pivot acts to moveably retain the mirror pivot on the mount post; and
   one or more coils fixedly coupled to the base member, and configured to generate, when current is driven through the one or more coils, one or more forces that act upon the one or more of the magnetic components of the mirror pivot such that an orientation of the mirror is adjusted.

2. The mirror tilt actuator as in claim 1, wherein the mirror pivot is held against the mount post via magnetic attraction between one or more of the magnetic components of the mirror pivot and a ferrous component on a side of a point of contact between the mirror pivot and the mount post that is opposite from the mirror pivot.

3. The mirror tilt actuator as in claim 1, wherein the mirror pivot is moveably retained on the mount post without any resilient spring to keep the mirror pivot mounted on the mount post.

4. The mirror tilt actuator as in claim 1, wherein the mirror pivot is moveably retained on the mount post without any resilient spring to provide a resistance to a tilting force applied to the mirror pivot.

5. The mirror tilt actuator as in claim 1, wherein the magnetic force of the magnetic component of the mirror pivot is an attraction force between the magnetic component of the mirror pivot and a slug of ferrous material fixed to a support structure, wherein the attraction force both provides a contact force of the mirror pivot onto a pivot of the mount post and generates a restoring torque to resist a tilting action as the mirror pivot is tilted.

6. The mirror tilt actuator as in claim 1, wherein the magnetic force of the magnetic component to moveably retain the mirror pivot on the mount post acts in concert with a ferrous slug fixedly mounted to the base member beneath the mount post to moveably retain the mirror pivot on the mount post.

7. The mirror tilt actuator recited in claim 1, wherein the coils comprise four non-moving coils disposed around four sides of the magnet that, when driven with electric signals, generate Lorentz forces to tilt the magnet and the mirror about a pivot.

8. The mirror tilt actuator recited in claim 1, further comprising one or more sensors fixedly coupled to the mirror pivot and configured to detect magnetic fields within the actuator.

9. A device, comprising:
   a housing;
   a light source, fixedly mounted to the housing, that emits light to illuminate objects in a scene;
   a photosensitive detector;

a mount post fixedly mounted to the housing;
a mirror pivot:
fixedly mounted to a mirror,
that comprises one or more magnetic components, and
that is moveably retained on the mount post, wherein a magnetic force of the one or more of the magnetic components of the mirror pivot acts to moveably retain the mirror pivot on the mount post while the orientation of the mirror is adjusted; and
one or more coils that, when current is driven through the one or more coils, generate one or more forces that act on one or more of the magnetic components such that an orientation of the mirror is adjusted.

10. The device recited in claim 9, wherein the mirror pivot is held against the mount post via magnetic attraction between the magnetic component of the mirror pivot and a ferrous component on a side of a point of contact between the mirror pivot and the mount post that is opposite from the mirror pivot.

11. The device recited in claim 9, wherein the mirror pivot is moveably retained on the mirror pivot on the mount post without a resilient spring that would keep the mirror pivot on the mount post.

12. The device recited in claim 9, wherein the magnetic force of the magnetic component of the mirror pivot is an attraction force between the magnetic component of the mirror pivot and a slug of ferrous material fixed to a support structure of the device, wherein the attraction force both provides a contact force of the mirror pivot onto the mount post and generates a restoring torque to resist a tilting action of the mirror pivot.

13. The device recited in claim 9,
further comprising a base member fixedly mounted to the housing, and that supports the mount post;
wherein the magnetic force of the magnetic component of the mirror pivot that acts to moveably retain the mirror pivot on the mount post acts in concert with a ferrous slug positioned between the base member and the mount post to moveably retain the mirror pivot on the mount post.

14. The device recited in claim 9, wherein the coils comprise four non-moving coils disposed around four sides of the magnet that, when driven with electric signals, generate Lorentz forces that tend to tilt the magnet and the mirror about a pivot of the mount post.

15. The device recited in claim 9, wherein the photosensitive detector is a partially transparent photosensitive detector in the direct path of the light to a scene to determine an outgoing angle of such light for use in construction of a digital representation of the scene.

16. The device recited in claim 9, further comprising cover glass;
wherein the photosensitive detector is a partially transparent photosensitive detector in the direct path of the light and is mounted in a cover glass of the device.

17. A method, the method comprising:
driving one or more coils to generate one or more forces that act upon one or more magnet components of a mirror pivot fixedly coupled to a mirror, wherein the one or more forces act to tilt the mirror about a pivot on a mount post to which the mirror pivot is moveably retained;
wherein a magnetic force of one or more of the magnetic components of the mirror pivot acts to moveably retain the mirror pivot on the mount post to which the mirror pivot is moveably retained.

18. The method recited in claim 17, further comprising:
driving the one or more coils to control the mirror to reflect light from a light source to one or more objects in a scene at an outgoing angle;
measuring an outgoing angle of the light using a partially transparent photosensitive detector in a direct path of the light;
receiving, by a detector, reflected light from the objects; and
constructing, based on the reflected light, a depth map of the scene.

19. The method recited in claim 18, the method further comprising driving the one or more coils to adjust the outgoing angle based on calculations of a closed loop feedback system in response to said measuring the outgoing angle of the light using the partially transparent photosensitive detector.

20. The method recited in claim 18, wherein:
the one or more coils are disposed about sides of the mirror pivot,
said driving one or more coils to generate one or more magnetic forces comprises driving, by a mirror tilt actuator, electricity though the one or more coils to interact with a fringing field of the mirror pivot,
said interact with the fringing field causes an adjustment to a position of the mirror to adjust the outgoing angle of the light, and
the fringing field includes components of a magnetic field in appropriate directions to deliver Lorentz forces, when the coils are electrically driven.

* * * * *